United States Patent
Che et al.

(10) Patent No.: US 10,733,414 B2
(45) Date of Patent: *Aug. 4, 2020

(54) SYSTEM AND METHOD FOR PERSONAL IDENTIFICATION BASED ON MULTIMODAL BIOMETRIC INFORMATION

(71) Applicant: Xiamen ZKTeco Electronic Biometric Identification Technology Co., Ltd., Xiamen (CN)

(72) Inventors: Quan Hong Che, Beijing (CN); Shu Kai Chen, Beijing (CN); Zhi Nong Li, Beijing (CN)

(73) Assignee: ZKTECO CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/906,963

(22) PCT Filed: Dec. 1, 2014

(86) PCT No.: PCT/CN2014/092704
§ 371 (c)(1),
(2) Date: Jan. 22, 2016

(87) PCT Pub. No.: WO2016/086343
PCT Pub. Date: Jun. 9, 2016

(65) Prior Publication Data
US 2016/0328600 A1    Nov. 10, 2016

(51) Int. Cl.
*G06K 9/20* (2006.01)
*G06K 9/00* (2006.01)
*G06T 7/11* (2017.01)

(52) U.S. Cl.
CPC ....... *G06K 9/00087* (2013.01); *G06K 9/0008* (2013.01); *G06K 9/00073* (2013.01);
(Continued)

(58) Field of Classification Search
CPC ..... G06K 2009/00932; G06K 9/00073; G06K 9/00087; G06K 9/2018; G06K 9/0002;
(Continued)

(56) References Cited

U.S. PATENT DOCUMENTS

| 5,391,889 A | * | 2/1995 | Nishijima | ............... | G06K 9/346 |
| | | | | | 250/555 |
| 5,920,384 A | * | 7/1999 | Borza | ................ | G06K 9/00046 |
| | | | | | 356/71 |

(Continued)

FOREIGN PATENT DOCUMENTS

| CN | 102542263 A | 7/2012 |
| CN | 103136505 A | 6/2013 |

(Continued)

OTHER PUBLICATIONS

Hyeon Chang Lee, Kang Ryoung Park, Byung Jun Kang, Sung Joo Park; "A New Mobile Multimodal Biometric Device Integrating Finger Vein and Fingerprint Recognition"; IEEE; 2009.*

(Continued)

*Primary Examiner* — Shaghayegh Azima
(74) *Attorney, Agent, or Firm* — Pillsbury Winthrop Shaw Pittman LLP

(57) ABSTRACT

Methods, systems, and programming for identifying a person are presented. In one example, a first set of candidates is determined based on a fingerprint image acquired from a finger of the person. A second set of candidates is determined based on a finger vein image acquired from the finger. The person is recognized based on the first and/or second set of candidates.

29 Claims, 22 Drawing Sheets

(52) U.S. Cl.
CPC ..... *G06K 9/00093* (2013.01); *G06K 9/00885* (2013.01); *G06K 9/00892* (2013.01); *G06K 9/2018* (2013.01); *G06T 7/11* (2017.01); *G06K 2009/00932* (2013.01); *G06T 2207/10004* (2013.01)

(58) Field of Classification Search
CPC ............. G06K 9/0004; G06K 9/00046; G06K 9/0008; G06K 9/00093; G06K 9/00885; G06K 9/00892; G06K 9/6293; G06K 9/00067; G06K 9/00; G06T 2207/10004; G06T 7/0081; G06T 7/11

See application file for complete search history.

(56) References Cited

U.S. PATENT DOCUMENTS

| | | | | |
|---|---|---|---|---|
| 7,961,918 | B2* | 6/2011 | Hikita | G06K 9/0002 382/115 |
| 8,670,596 | B2* | 3/2014 | Miura | G06K 9/00013 382/115 |
| 2002/0126396 | A1* | 9/2002 | Dolgoff | H04N 13/346 359/743 |
| 2004/0184641 | A1* | 9/2004 | Nagasaka | G06K 9/00013 382/124 |
| 2006/0215887 | A1* | 9/2006 | Nishimura | G06K 9/0012 382/124 |
| 2007/0253607 | A1* | 11/2007 | Higuchi | G06K 9/00026 382/124 |
| 2008/0247613 | A1* | 10/2008 | Chang | G06K 9/00046 382/124 |
| 2009/0214083 | A1* | 8/2009 | Sato | A61B 5/1172 382/107 |
| 2009/0232362 | A1* | 9/2009 | Otsubo | G06K 9/00026 382/115 |
| 2010/0045431 | A1* | 2/2010 | Nagamura | G06F 1/1626 340/5.82 |
| 2010/0245556 | A1* | 9/2010 | Kanda | G06K 9/00046 348/77 |
| 2011/0135171 | A1* | 6/2011 | Galigekere | G06T 7/0012 382/128 |
| 2011/0185308 | A1* | 7/2011 | Machida | G06F 3/0485 715/784 |
| 2011/0200237 | A1* | 8/2011 | Nakamura | A61B 5/1171 382/127 |
| 2011/0222740 | A1* | 9/2011 | Kitane | A61B 5/6843 382/115 |
| 2011/0304720 | A1* | 12/2011 | Kumar | G06K 9/0008 348/77 |
| 2011/0310044 | A1* | 12/2011 | Higuchi | G06F 1/1684 345/173 |
| 2012/0150450 | A1* | 6/2012 | Monden | G06F 21/32 702/19 |
| 2012/0230555 | A1* | 9/2012 | Miura | G06K 9/00087 382/124 |
| 2013/0013527 | A1* | 1/2013 | Takata | G06Q 50/26 705/325 |
| 2013/0027184 | A1* | 1/2013 | Endoh | G06K 9/00892 340/5.83 |
| 2013/0129164 | A1* | 5/2013 | Gu | G06K 9/00013 382/124 |
| 2013/0318361 | A1* | 11/2013 | Erickson | H04L 9/3257 713/193 |
| 2014/0007210 | A1* | 1/2014 | Murakami | G06K 9/00899 726/7 |
| 2014/0086459 | A1* | 3/2014 | Pan | G06K 9/00006 382/124 |
| 2014/0133710 | A1* | 5/2014 | Hama | G06K 9/00087 382/115 |
| 2015/0014141 | A1* | 1/2015 | Rao | G06K 9/0002 200/600 |
| 2015/0015537 | A1* | 1/2015 | Riedijk | G06F 3/044 345/174 |
| 2015/0022495 | A1* | 1/2015 | Bussat | G06F 3/044 345/174 |
| 2015/0062319 | A1* | 3/2015 | Higuchi | A61B 5/1171 348/77 |
| 2015/0117726 | A1* | 4/2015 | Higuchi | A61B 5/1171 382/124 |
| 2015/0146944 | A1* | 5/2015 | Pi | G06K 9/00087 382/124 |
| 2015/0193669 | A1* | 7/2015 | Gu | G06K 9/46 348/77 |
| 2015/0356339 | A1* | 12/2015 | Demos | H04N 7/18 348/77 |
| 2016/0011767 | A1* | 1/2016 | Jung | G06F 3/0488 715/847 |
| 2016/0063294 | A1* | 3/2016 | Du | G06K 9/0002 382/124 |
| 2016/0063300 | A1* | 3/2016 | Du | G06K 9/00033 382/124 |
| 2016/0171281 | A1* | 6/2016 | Park | G06F 3/044 382/124 |
| 2016/0227081 | A1* | 8/2016 | Chang Chien | H04N 5/2254 |
| 2016/0328600 | A1* | 11/2016 | Che | G06T 7/11 |

FOREIGN PATENT DOCUMENTS

| | | |
|---|---|---|
| CN | 103207963 A | 7/2013 |
| CN | 103559483 A | 2/2014 |

OTHER PUBLICATIONS

International Search Report and Written Opinion dated Jul. 28, 2015 in International Application PCT/CN2014/092704.

* cited by examiner

SYSTEM AND METHOD FOR PERSONAL IDENTIFICATION BASED ON MULTIMODAL BIOMETRIC INFORMATION

CROSS REFERENCE TO RELATED APPLICATION

This application is a national stage application, filed under 35 U.S.C. § 371, of PCT Application No. PCT/CN2014/092704, filed on Dec. 1, 2014, entitled "SYSTEM AND METHOD FOR PERSONAL IDENTIFICATION BASED ON MULTIMODAL BIOMETRIC INFORMATION". The present application is related to PCT Application No. PCT/CN2014/092700, filed on Dec. 1, 2014, entitled "SYSTEM AND METHOD FOR ACQUIRING MULTIMODAL BIOMETRIC INFORMATION", which is incorporated herein by reference in its entirety.

BACKGROUND

1. Technical Field

The present disclosure relates to user/person identification; particularly, user/person identification based on multimodal biometric information.

2. Technical Background

Biometric information has been widely used for user identification and verification/authentication. Most conventional techniques focus on user identification/verification based on uni-modal biometric information, i.e., a single type of biometric information. For example, a fingerprint-based user identification device can identify a person based on fingerprint characteristics of a finger of the person. However, such systems may not be reliable for various reasons. For instance, the fingerprint-based user identification may have false rejections when the finger is moist, wet, or dirty. However, latent fingerprint acquired in real operational environment, moist, wet, dry, or dirty fingers are fairly common. In addition, the fingerprint-based user identification may also have false acceptances when, e.g., a finger is forged. In such situations, the reliability issues associated with a biometric information based authentication may lead to security issues.

Therefore, there is a need to provide a biometric information based identification/verification solution with improved reliability.

SUMMARY

The present teaching relates to methods, systems, and programming for user identification. Particularly, the present teaching is directed to methods, systems, and programming for user/person identification based on multimodal biometric information.

In one example, a system for recognizing a person is disclosed. The system comprises a first recognition portion, a second recognition portion, and an identity determiner. The first recognition portion is configured for determining a first set of candidates based on a fingerprint image acquired from a finger of the person. The second recognition portion is configured for determining a second set of candidates based on a finger vein image acquired from the finger. The identity determiner is configured for recognizing the person based on the first and/or second set of candidates.

In another example, a method for recognizing a person is disclosed. A first set of candidates is determined based on a fingerprint image acquired from a finger of the person. A second set of candidates is determined based on a finger vein image acquired from the finger. The person is recognized based on the first and/or second set of candidates.

In yet another example, a method for identifying a person is disclosed. A finger vein image acquired from the person is received. A characteristic finger vein image is generated based on the finger vein image. The characteristic finger vein image is compared with each of a plurality of candidate characteristic finger vein images stored in a database so that each of the candidate characteristic finger vein images is associated with a confidence score. One or more matching candidates are selected based on the confidence scores associated therewith. The person is identified based on the confidence score of each of the one or more candidates.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1A:
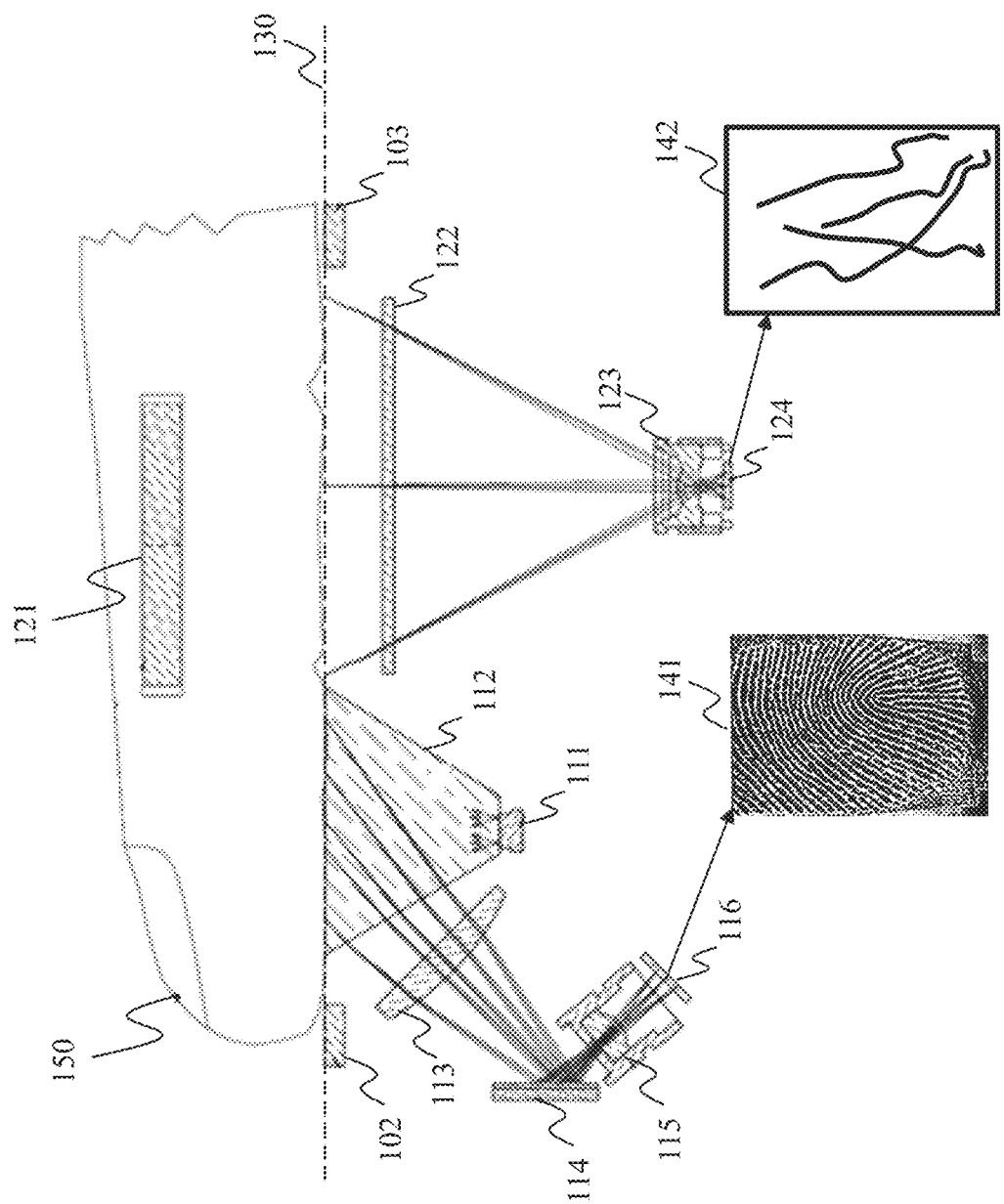
FIG. 1A illustrates a side view of a portion of an exemplary product, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details or in conjunction with additional features. In other instances, well known methods, procedures, systems, components, and/or circuitry have been described at a relatively high-level, without detail, in order to avoid unnecessarily obscuring aspects of the present teachings.

The present disclosure describes method, system, and programming aspects of acquiring multimodal biometric information and identifying a person based on the multimodal biometric information. The multimodal biometric information of a person may include, but not limited to, information relating to a fingerprint of a finger of the person and information relating to a finger vein of the finger. Applications of such user identification include secure access, e.g., to a building, a device, a software application installed on a computing device, etc. For example, when a person tries to enter a building through a door controlled by a security system (that is, e.g., installed on or in the vicinity of the door), the security system may inform the person to place a finger onto a user-identification device. The user-identification device can determine whether the person has a known and/or authorized identity to be allowed to enter the building.

After the person places a finger on a surface of the device, a detector on the device can detect the finger and thus trigger two (or more) light sources on the device to emit lights onto the finger. For example, a first light source emits a first light to the finger. The first light is reflected by a fingerprint portion of the finger and projected onto a first sensor. The first sensor may generate a fingerprint image that captures biometric information relating to the fingerprint of the finger with the first light.

Additionally, a second light source may include two opposing light emitting units residing on two opposing sides of the finger when the person places the finger on the surface. After detection of the finger, each light emitting unit emits a second light to the finger so that a finger vein of the finger is exposed to the second light and made visible to a second sensor. The second sensor may generate a finger vein image that captures biometric information relating to the finger vein of the finger with the second light.

The finger vein image and the fingerprint image may be processed and matched separately. For example, features including minutiae are extracted from the fingerprint image. A fingerprint template is generated based on such extracted features. The fingerprint template is then matched against fingerprint templates pre-stored in a database. The database may include identities of persons (name, employee number, etc.) that are known to have access to the building. Corresponding to each known identity, the database includes pre-known fingerprint template and pre-known finger vein image (and other information) associated with that identity.

The finger vein image generated by the second sensor may also be processed before being matched against finger vein images in the database. In some embodiments of the present disclosure, a region in the finger vein image is segmented where the vein is present in the image. Further, geometric features of the finger vein image may be normalized to have a normalized shape, size, and direction of the image. The gray level of the finger vein image may also be normalized. Blood vessels in the normalized finger vein image may be identified. In addition, noise may be removed from the finger vein image and the finger vein image may be compressed. Such characteristic finger vein image is matched against candidate finger vein images pre-stored in the database.

In one scenario, the person's identity can be determined if both the characteristic finger vein image matches a finger vein image associated with a known identity and the fingerprint template matches a fingerprint template associated with the same known identity. In another scenario, the person can be identified if either the characteristic finger vein image matches a finger vein image associated with a known identity or the fingerprint template matches a fingerprint template associated with a known identity. Based on the determined identity of the person, the person may be allowed or denied to enter the building.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

Figure 1B:
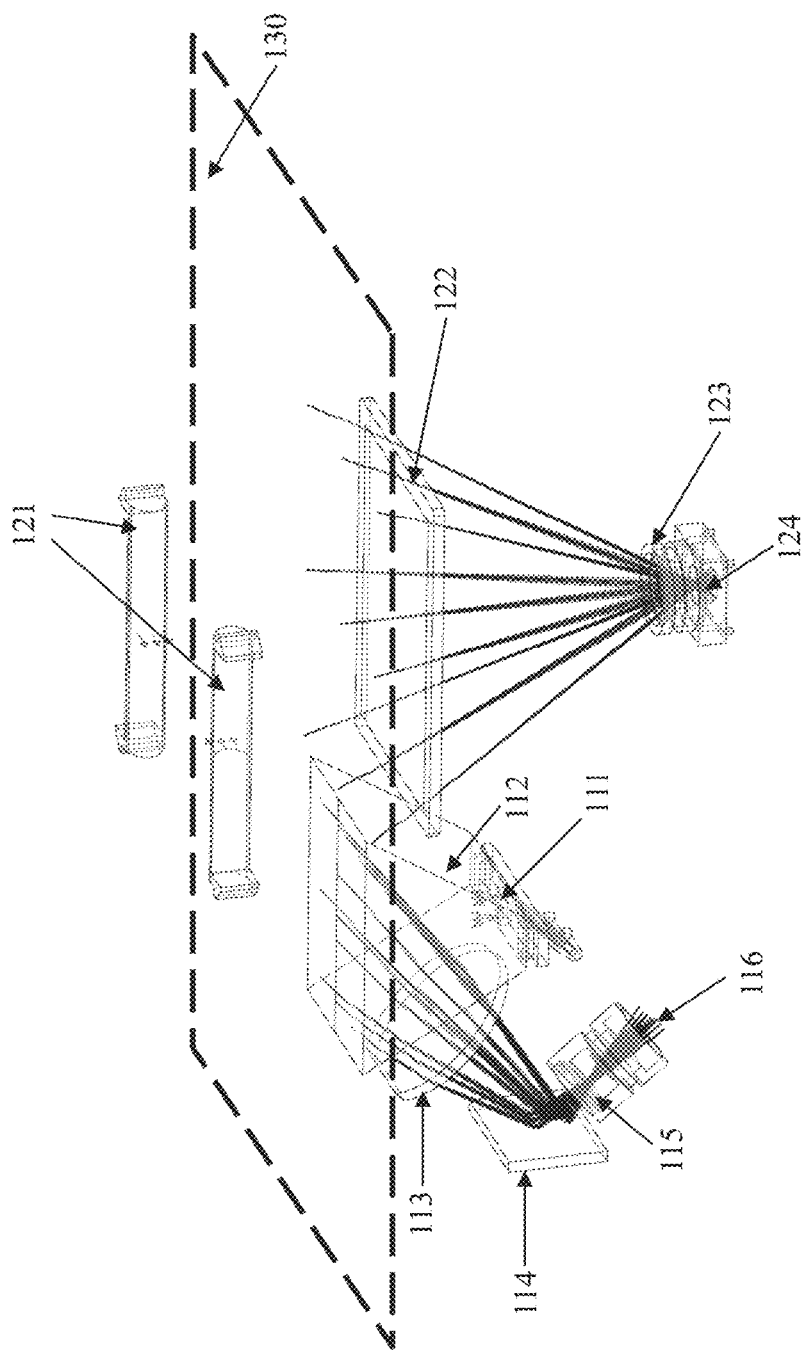
FIG. 1B illustrates a prospective view of a portion of an exemplary product, according to an embodiment of the present teaching.

FIG. 1A illustrates a side view of a portion of an exemplary product, according to an embodiment of the present teaching. FIG. 1B illustrates a prospective view of a portion of the exemplary product, according to an embodiment of the present teaching. As shown in FIG. 1A, a person may place a finger 150 onto a surface 130 of the exemplary product. Underneath the surface 130, there is a detector configured to detect the finger 150 once the finger 150 is fully or at least partially placed onto the surface 130. In this example, the detector includes two detecting units 102, 103. Each detecting unit may be a capacitance sensor. A first detecting unit 102 is configured to detect a first portion of the finger 150, e.g., a finger portion close to fingertip; while a second detecting unit 103 is configured to detect a second portion of the finger 150, e.g., that is close to finger root. In one embodiment, the finger 150 is detected when one of the first and second portions is detected. In another embodiment, the finger 150 is detected when both the first and second portions are detected.

After the finger 150 is detected, the product generates a signal that can trigger a first light source 111 and a second light source 121 to generate lights. The first light source 111 in this example includes an LED (light-emitting diode) lamp bead for fingerprint information collection. The second light source 121 in this example includes two (parallel and) opposing light plates as shown in FIG. 1B for finger vein information collection. In operation, when the finger 150 is placed onto the surface 130, the two light plates 121 would reside on two opposing sides of the finger 150.

Once triggered, the LED lamp bead 111 generates a first light beam propagating through a prism 112 and towards the fingerprint portion of the finger 150 to enable an acquisition of a fingerprint image of the finger 150. The first light beam is reflected at the surface 130 to propagate towards a magnifying lens 113. The first light beam is then magnified by the magnifying lens 113, reflected by a reflective mirror 114, minified by a small lens 115, and finally projected onto a first sensor 116. The first sensor 116 in this example is a CMOS (complementary metal-oxide-semiconductor) sensor that can sense light reflected by the fingerprint portion. The first sensor 116 may transform the sensed light at each picture location into electrical signal(s) representing a gray scale value at different locations of the picture. A fingerprint image 141 of the finger 150 is thus collected.

In one embodiment, at the same time as the LED lamp bead 111 being triggered, the two light plates 121, residing face to face on two opposing sides of the finger 150, are also triggered to generate two opposing light beams towards the finger 150. In another embodiment, the two light plates 121 are triggered to generate two opposing light beams before or after the LED lamp bead 111 is triggered. But in either embodiment, the finger 150 does not have to be placed onto the surface 130 more than once to collect fingerprint and finger vein information.

In this example, the two light beams are two infrared light beams that can traverse through the finger 150 so that blood vessels of the vein of the finger 150 are visible (i.e., exposed to) the infrared light beams and can be captured by a second sensor 124. Light from the visible vein is projected through a dustproof flat glass 122 and a lens group 123, and then projected onto the second sensor 124. The second sensor 124 in this example is another CMOS sensor that can sense light from the visible or exposed vein in the finger 150. The second sensor 124 may also transform the sensed light at each picture location into electrical signal(s) representing a gray scale value at different locations of the picture. A finger vein image 142 of the finger 150 is thus collected.

It can be understood by one skilled in the art that the first and second light sources may be used as sources of radiations or "lights" of any frequencies or wavelengths, in accordance with various embodiments of this disclosure. Further, in the present teaching, the term "light" has a general meaning that includes an electromagnetic radiation with any wavelength as well as a radiation of energy in the form of rays or waves or particles. For example, the second light source may emit x-ray so that an image of bones in the finger may be obtained for user identification, in accordance with one embodiment of the present teaching.

Figure 2A:
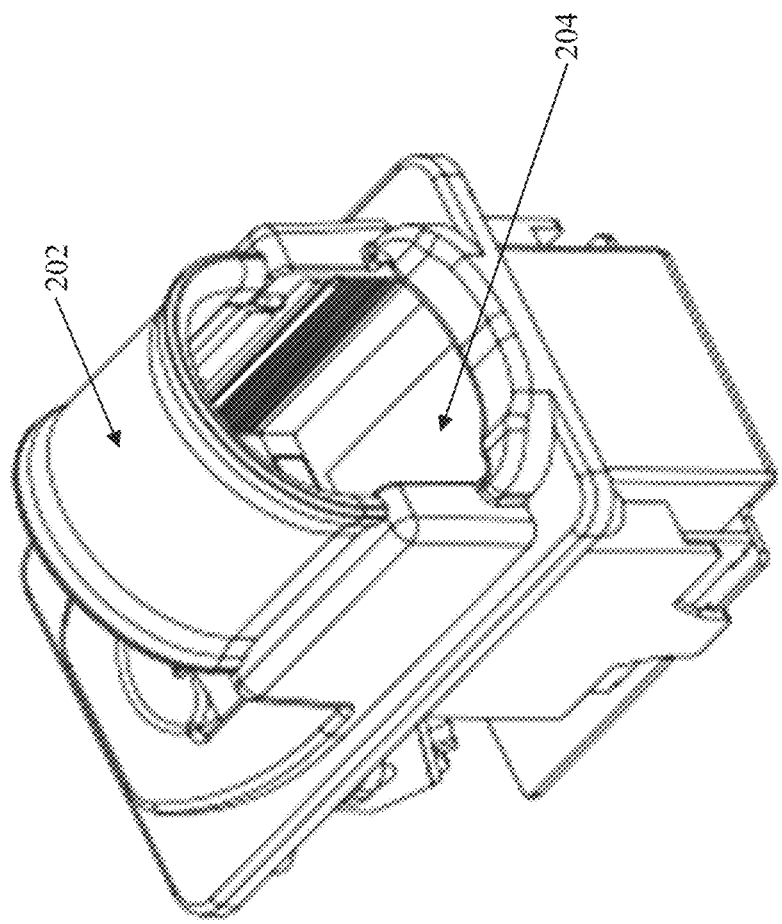
FIG. 2A illustrates a stereoscopic view of an exemplary product, according to an embodiment of the present teaching.
Figure 2B:
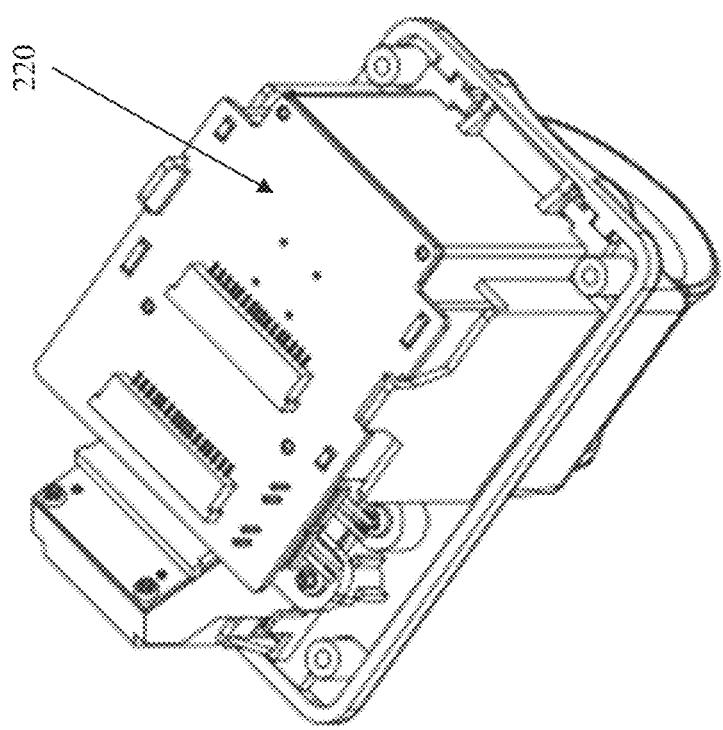
FIG. 2B illustrates another stereoscopic view of an exemplary product, according to an embodiment of the present teaching.

FIG. 2A illustrates a stereoscopic view of an exemplary product, according to an embodiment of the present teaching. FIG. 2B illustrates another stereoscopic view of the exemplary product, according to an embodiment of the present teaching. As shown in FIG. 2A, the product may include a groove 204 on the top surface of the product, so that a finger can be placed onto the groove 204 for fingerprint and finger vein data collections. A cover 202 may be included in the product so that some light scattered from the finger can be reflected back to the finger. The cover 202 is optional in the present teaching. In one embodiment, the product does not have the cover 202. As shown in FIG. 2B, on the back side of the product, there is a plate 220 that can be mounted to a wall, a door, or connected to another device for user identification and authorization.

Figure 3:
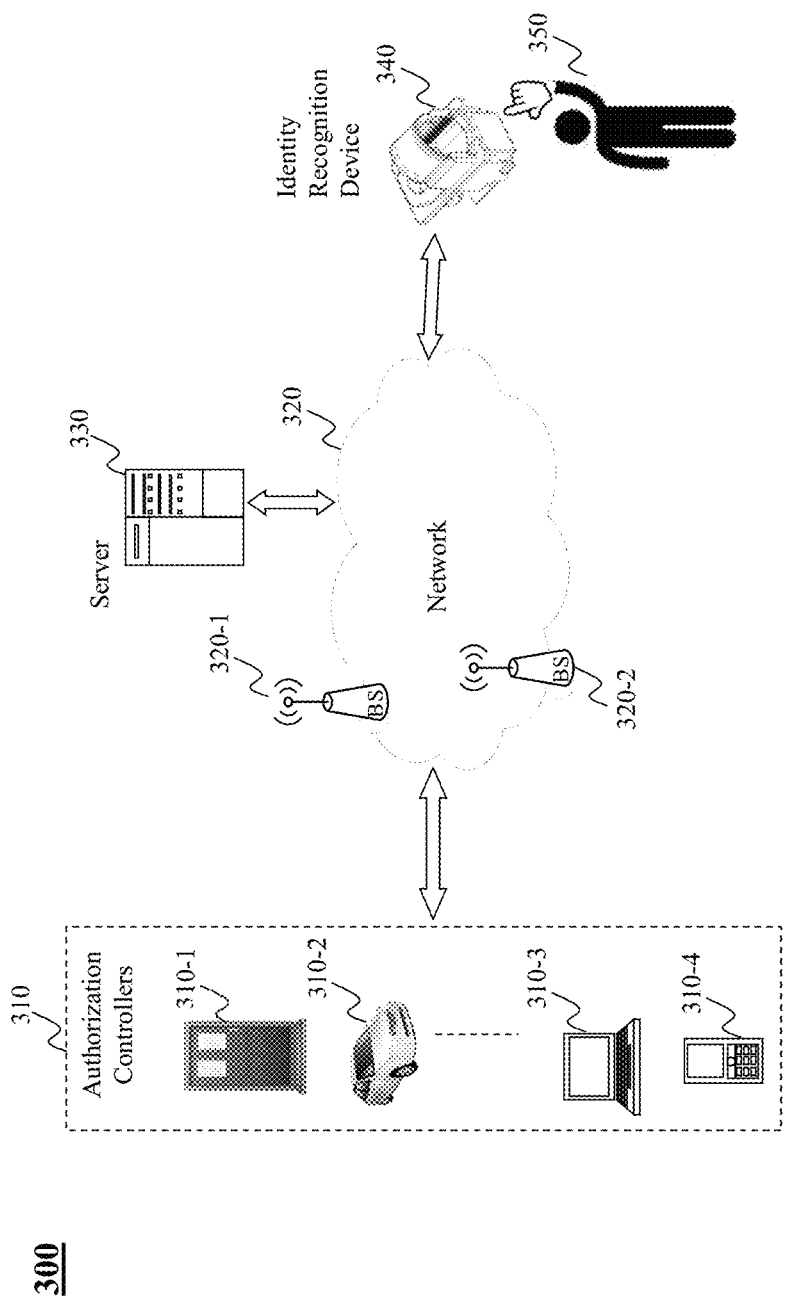
FIG. 3 is a high level depiction of an exemplary system for user identification, according to an embodiment of the present teaching.

FIG. 3 is a high level depiction of an exemplary system 300 for user identification and authorization, according to an embodiment of the present teaching. In FIG. 3, the exemplary system 300 includes a server 330, an identity recognition device 340, one or more authorization controllers 310, a user 350, and a network 320. The network 320 may be a single network or a combination of different networks. For example, the network 320 may be a local area network (LAN), a wide area network (WAN), a public network, a private network, a proprietary network, a Public Telephone Switched Network (PSTN), the Internet, a wireless network, a virtual network, or any combination thereof. The network 320 may also include various network access points, e.g., wired or wireless access points such as base stations or Internet exchange points 320-1 . . . 320-2, through which an authorization controller 310 may connect to the network 320 in order to obtain authorization information via the network 320.

Authorization controllers 310 may be of different types such as authorization controllers connected to a door 310-1, a car 310-2, a laptop computer 310-3, or a mobile device 310-4. A user 350 may want to access a building through a door, access a car, or access data in a laptop or a mobile device. In each case, the user 350 has to obtain access authorization from a corresponding authorization controller 310. The access authorization may be obtained by a user identification process performed at the identity recognition device 340 that is connected to the authorization controllers 310, e.g., directly or as shown, via the network 320.

The identity recognition device 340 may include the portion of a product described according to FIG. 1A and FIG. 1B. The identity recognition device 340 can acquire biometric information about a fingerprint and a finger vein from a same finger of the user 350. Based on the acquired biometric information, the identity recognition device 340 identifies the user 350 either by itself or with the help of the server 330.

In one embodiment, the identity recognition device 340 identifies the user 350 by communicating with the server 330 via the network 320. This may be applicable in a case where a user wants to enter a building associated with a company that has hundreds or thousands of employees and many office buildings. In this case, user or employee data used for identifying and authorizing access may be relatively large and change very frequently. Thus, it may not be practical to have such vast data provided at each office building location. As such, user/employee data needed for identity recognition and authorization may be stored in a common server 330 and be accessible to many identity recognition devices 340 associated with the different office locations. For example, after an identity recognition device 340 captures and generates a fingerprint image and a finger vein image from a finger of the user 350, the identity recognition device 340 may send the images to the server 330 via the network 320. The server 330 may compare the fingerprint image and the finger vein image with images in a database implemented at the server 330. The server 330 may then send an outcome of the image comparison back to the identity recognition device 340 for user identification or directly to the authorization controller 310 for user authorization.

In one embodiment, the identity recognition device 340 captures and generates only a finger vein image from a finger of the user 350. After the identity recognition device 340 sends the image to the server 330 via the network 320, the server 330 may compare the finger vein image with images in a database implemented at the server 330. The server 330 may then send an outcome of the image comparison back to the identity recognition device 340 for user identification or directly to the authorization controller 310 for user authorization.

Figure 4:
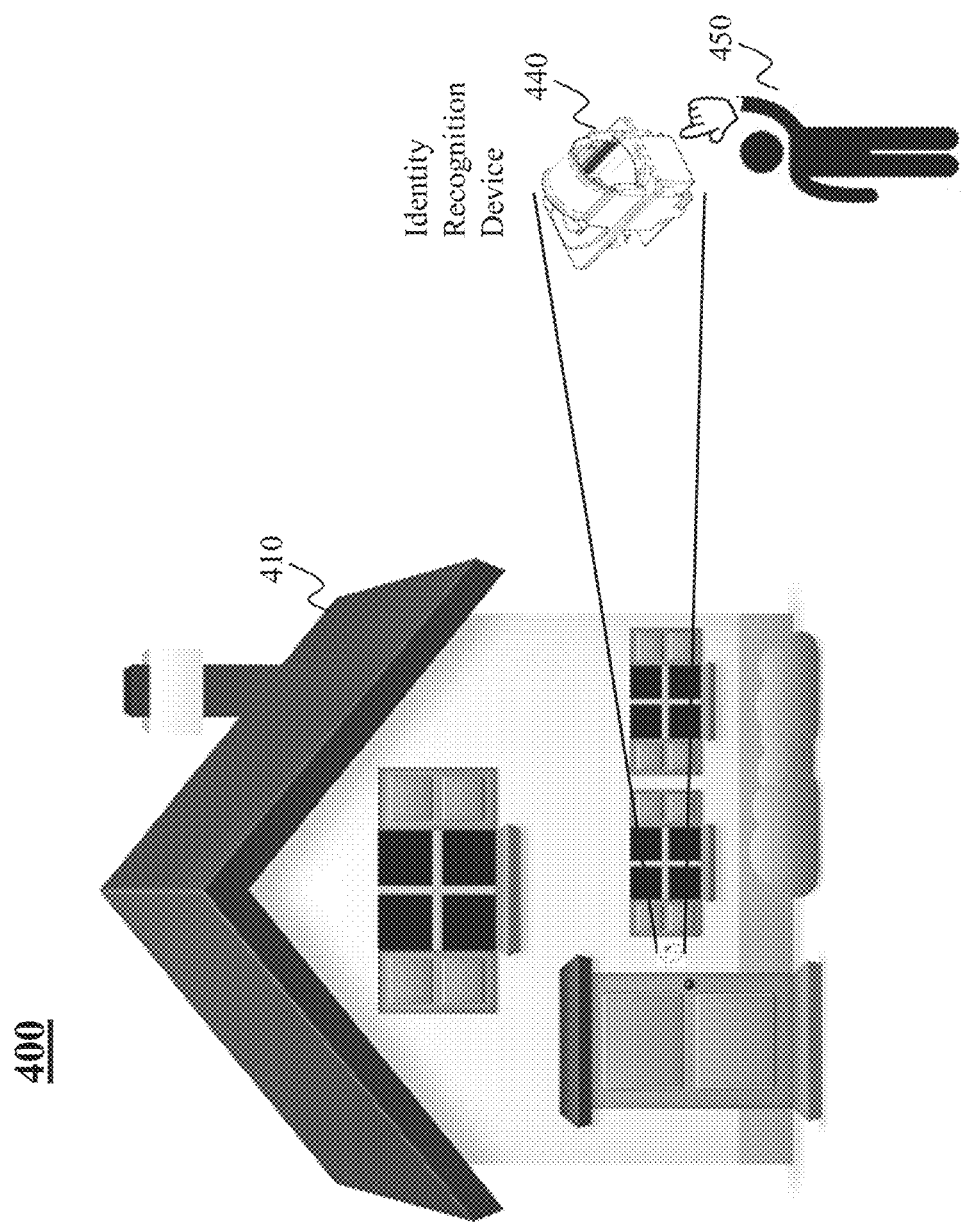
FIG. 4 is a high level depiction of another exemplary system for user identification, according to an embodiment of the present teaching.

FIG. 4 is a high level depiction of another exemplary system 400 for user identification and authorization, according to an embodiment of the present teaching. The exemplary system 400 in this embodiment includes an authorization controller 410, the identity recognition device 440, and a user 450. In this example, the user 450 wants to enter a building through a door which is controlled by the authorization controller 410. The identity recognition device 440 in this example is located near the door and can directly communicate with the authorization controller 410 without a network.

In this embodiment, the identity recognition device 440 may have the inherent capability to identify the user 450. This may be applicable in a case where a user wants to enter a specific building (e.g., a private residence) associated with a small group of people. In this case, user or employee data used for identifying and authorizing access may be relatively small and static, and the user identification process may not need many resources. As such, the database with user information may be implemented or provided locally at the identity recognition device 440. For example, after an identity recognition device 440 generates a fingerprint image and a finger vein image from a finger of the user 450, the identity recognition device 440 may compare the fingerprint image and the finger vein image with images in the local database to obtain matching results for user identification. Based on the comparison results, the identity recognition device 440 can determine whether the user 450 has an authorization, and send the authorization information to the authorization controller 410 for authorizing access or denying access.

Figure 5:
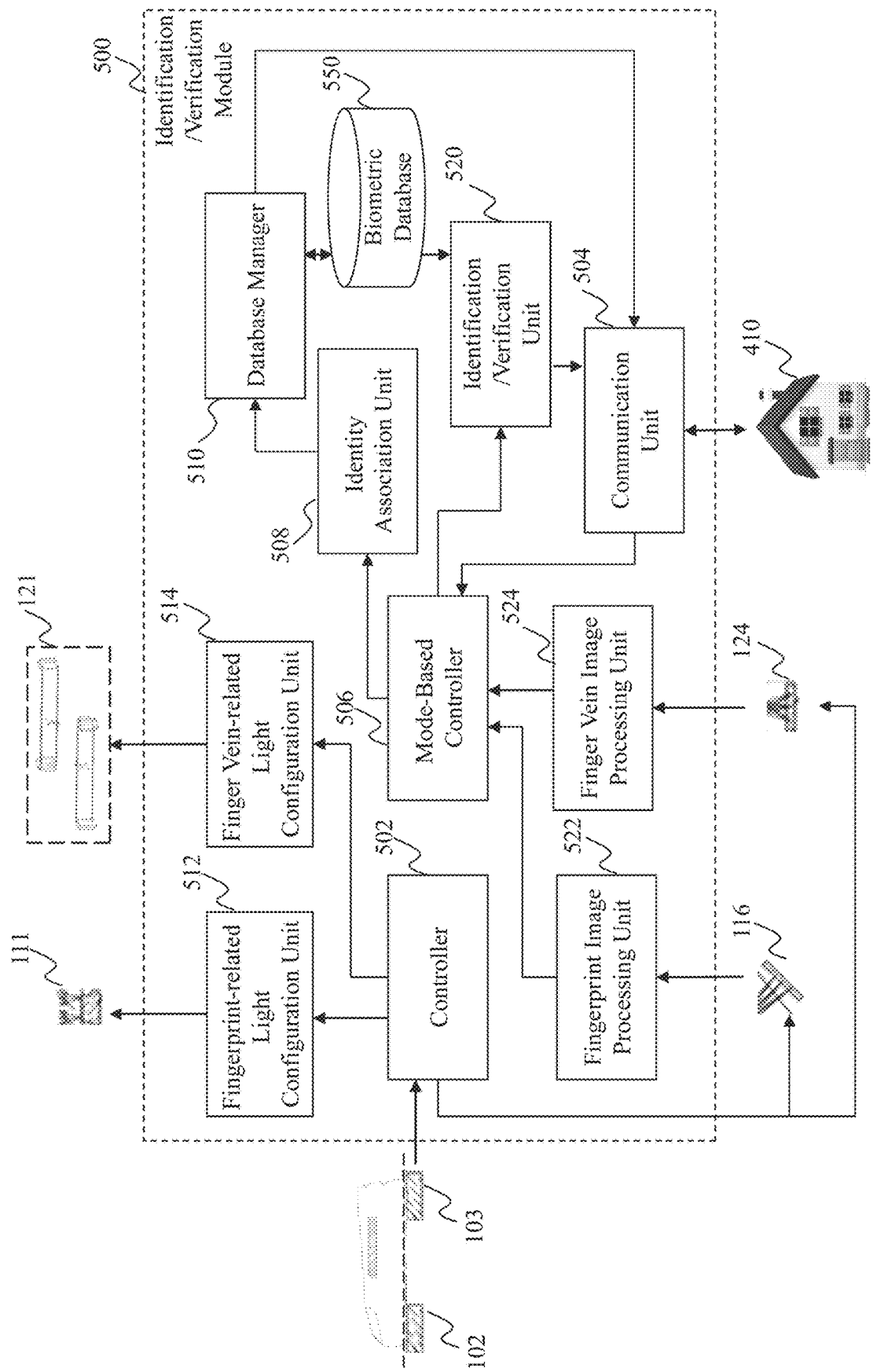
FIG. 5 illustrates an exemplary diagram of an identification/verification module in a system for user identification, according to an embodiment of the present teaching.

FIG. 5 illustrates an exemplary diagram of an identification/verification module 500 in a system for user identification, according to an embodiment of the present teaching. The identification/verification module 500 may be located in the identity recognition device 440 shown in FIG. 4. The identification/verification module 500 in this example includes a controller 502, a fingerprint-related light configuration unit 512, a finger vein-related light configuration unit 514, a fingerprint image processing unit 522, a finger vein image processing unit 524, a communication unit 504, a mode-based controller 506, an identity association unit 508, a database manager 510, and an identification/verification unit 520.

The controller 502 in this example receives information from the detector, i.e., the two detecting units 102, 103. If a finger is detected, the controller 502 will initiate the fingerprint-related light configuration unit 512 and the finger vein-related light configuration unit 514 to configure the first light source 111 and the second light source 121, respectively. For example, the fingerprint-related light configuration unit 512 may configure the first light source 111 to emit light with wavelengths, e.g., in the zone of visible lights so that the light emitted from the first light source 111 can be reflected by the finger. The finger vein-related light configuration unit 514 may configure the second light source 121 to emit infrared light that can transmit through the finger. In one example, the first light source 111 and the second light source 121 can emit lights with a same wavelength.

In one embodiment, the controller 502 also controls the first sensor 116 and the second sensor 124 to sense the light and collect images. In another embodiment, the first sensor 116 and the second sensor 124 can sense the light and collect images automatically without control from the controller 502. In either embodiment, the first sensor 116 will generate a fingerprint image and send it to the fingerprint image processing unit 522 for processing, and the second sensor 124 will generate a finger vein image and send it to the finger vein image processing unit 524 for processing.

The fingerprint image processing unit 522 in this example receives the fingerprint image from the first sensor 116 and processes the fingerprint image to generate a fingerprint template. The process of the fingerprint image includes at least extracting features including minutiae from the fingerprint image, and generating the fingerprint template based on the extracted features.

The finger vein image processing unit 524 in this example receives the finger vein image from the second sensor 124 and processes the finger vein image to generate a characteristic finger vein image. A region in the finger vein image where the vein is present in the image is segmented. Further, geometric features of the finger vein image may be normalized to have a normalized shape, size, and direction of the image. The gray level of the finger vein image may also be normalized. Blood vessels in the normalized finger vein image may be identified. In addition, noise is removed from the finger vein image and the finger vein image may be compressed.

The communication unit 504 in this example communicates with the authorization controller 410. When a user tries to have an access controlled by the authorization controller 410, the authorization controller 410 may send a user identification request to the identification/verification module 500 via the communication unit 504. In another situation, when the system needs to collect biometric information from a user known or determined to have an access controlled by the authorization controller 410, the authorization controller 410 may send a biometric recording request to the identification/verification module 500 via the communication unit 504.

The mode-based controller 506 in this example receives the fingerprint template from the fingerprint image processing unit 522, receives the characteristic finger vein image from the finger vein image processing unit 524, and determines a work or operation mode for the identification/verification module 500 based on the request received from the authorization controller 410 via the communication unit 504. In one example, if the request received from the authorization controller 410 is a "user identification" request, the mode-based controller 506 will determine a work or operation mode to be directed to user identification. In this mode, the user's identity is unknown and needs to be determined based on the fingerprint template and the characteristic finger vein image. The mode-based controller 506 may then forward the fingerprint template and the characteristic finger vein image to the identification/verification unit 520 for user identification or verification.

In another example, if the request received from the authorization controller 410 is a "biometric recording" request, the mode-based controller 506 will determine a work or operation mode to be directed to biometric recording. In this mode, the user's identity is known but the user's biometric information, e.g., the information included in the fingerprint template and the characteristic finger vein image needs to be recorded. The mode-based controller 506 may then forward the fingerprint template and the characteristic finger vein image to the identity association unit 508 for recording the biometric information.

The identity association unit 508 in this example associates an identity with a template or an image. For example, a user's identity (e.g., name, employee number, etc.) is known and the authorization controller 410 requests to record the user's fingerprint and finger vein information. In this example, the identity association unit 508 receives the fingerprint template and the characteristic finger vein image from the mode-based controller 506, and associates them with the user's identity that is provided in the request from the authorization controller 410.

The database manager 510 in this example receives the fingerprint template and the characteristic finger vein image associated with the user's identity from the identity association unit 508, and saves them in a biometric database 550 located in the identification/verification module 500. The biometric database 550 in this example includes biometric information associated with respective user identities. The biometric information includes at least information from fingerprint templates and finger vein images. The fingerprint templates and finger vein images are stored in pairs in the biometric database 550, where each pair corresponds to an identity. To that end, each entry in the biometric database includes identity associated with a corresponding finger vein image and a corresponding fingerprint template that were generated from a same finger of the user having that identity. In one embodiment, the database manager 510 may update some biometric information in the biometric database 550, when new biometric information from a clearer (i.e., better resolution) image associated with an existing identity is available. After the database manager 510 saves or updates the biometric information, it may send a response to the authorization controller 410 via the communication unit 504 to inform that the biometric information has been recorded and/or updated.

It can be understood that in some embodiments, the fingerprint templates are stored in one database while the finger vein images are stored in another database.

The identification/verification unit 520 in this example identifies or verifies a person based on the fingerprint template and the characteristic finger vein image received from the mode-based controller 506. In one example, when a user wants to enter a building controlled by the authorization controller 410, he/she directly places a finger onto a surface of the device including the identification/verification module 500 without providing other information regarding his/her identity. The identification/verification unit 520 will then identify the user based on the fingerprint template and the characteristic finger vein image. In another example, when a user wants to enter a building controlled by the authorization controller 410, he/she places a finger onto the device including the identification/verification module 500 after providing other information regarding his/her identity, e.g., a username input by the user or identity information in a badge scanned by the user. The identification/verification unit 520 will then verify whether the user is indeed associated with the username, based on the fingerprint template and the characteristic finger vein image.

When the identification/verification unit 520 needs to identify a user, the identification/verification unit 520 compares the fingerprint template and the characteristic finger vein image received from the mode-based controller 506 with finger templates and finger vein images stored in the biometric database 550, respectively. Since there is no other information regarding the user's identity, the order of the comparisons can be determined based on a frequency of access associated with each identity. For example, if a first identity in the biometric database 550 has more frequent access than a second identity in the biometric database 550, the first identity should be checked before the second identity. Accordingly, the fingerprint template and the characteristic finger vein image are compared with those associated with the first identity before being compared with those associated with the second identity. The comparison result can be determined based on a certain threshold related to a confidence score. An identity is determined when the confidence score is greater than the threshold. The confidence score can be any real number or percentage number representing a degree of matching between two templates or two images.

In one embodiment, the identification/verification unit 520 may recognize a person only based on the characteristic finger vein image received from the mode-based controller 506. In that case, there is no need to collect fingerprint from the finger.

After identifying the user, the identification/verification unit 520 may send a response to the authorization controller 410 via the communication unit 504 to inform the identity of the user and whether the user should be authorized. In one embodiment, the identification/verification unit 520 merely informs the authorization controller 410 with the identity of the user and a corresponding confidence score; while the authorization controller will determine itself whether the user should be authorized.

When the identification/verification unit 520 needs to verify a user, the identification/verification unit 520 compares the fingerprint template and the characteristic finger vein image received from the mode-based controller 506 with a finger template and a finger vein image associated with the user-provide identity, e.g. the username, in the biometric database 550 respectively. The comparison result can be determined based on a threshold related to a confidence score. The identity is verified when the confidence score is larger than the threshold. The confidence score can be any real number or percentage number representing a degree of matching between two templates or two images. After verifying the user, the identification/verification unit 520 may send a response to the authorization controller 410 via the communication unit 504 to inform the identity of the user is verified and whether the user should be authorized.

Figure 6:
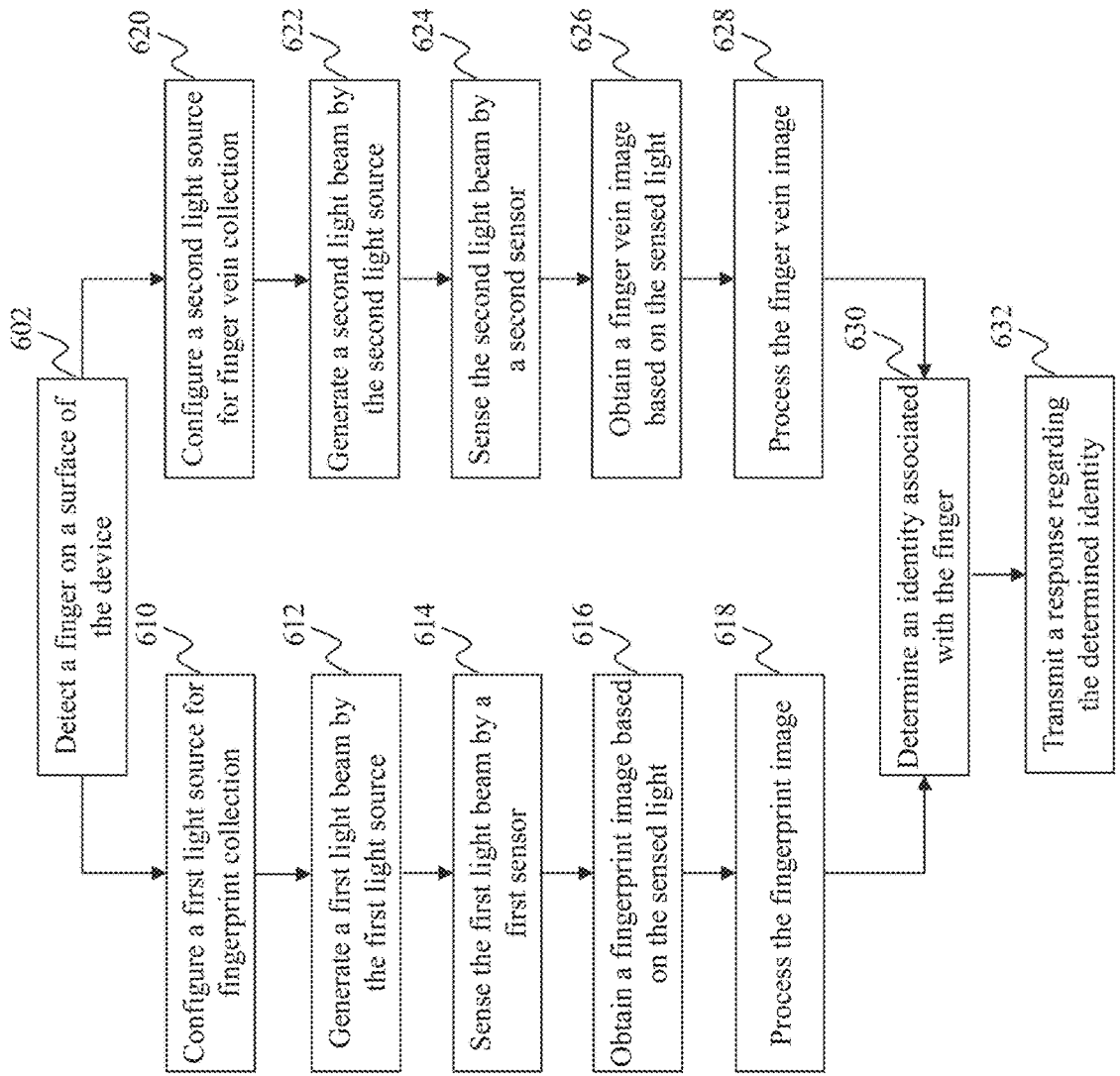
FIG. 6 is a flowchart of an exemplary process for user identification, according to an embodiment of the present teaching.

FIG. 6 is a flowchart of an exemplary process for user identification, according to an embodiment of the present teaching. In one example, the exemplary process in FIG. 6 may be performed by an exemplary device including the identification/verification module 500 shown in FIG. 5 when a user identification request is received from the authorization controller 410. Starting at 602, a finger is detected to be placed on a surface of the device. The process is then divided into two branches, where the two branches are performed separately.

The first branch is for fingerprint collection and processing. At 610, a first light source is configured for fingerprint collection. At 612, a first light beam is generated by the first light source according to the configuration. At 614, the first light beam is reflected by a fingerprint portion of the finger and is sensed by a first sensor. At 616, a fingerprint image is obtained based on the sensed light. At 618, the fingerprint image is processed to generate a fingerprint template. The first branch then merges to 630.

The second branch is for finger vein collection and processing. At 620, a second light source is configured for finger vein collection. At 622, a second light beam is generated by the second light source according to the configuration. At 624, the second light beam is scattered by the finger vein and is sensed by a second sensor. At 626, a finger vein image is obtained based on the sensed light. At 628, the finger vein image is processed to generate a characteristic finger vein image. The second branch then merges to 630.

At 630, an identity associated with the finger is determined. In another example not shown, at 630, an identity associated with the finger is verified based on a user-provided identity. The identity may be determined at 630 based on the processed fingerprint image, the processed finger vein image, or both. At 632, a response regarding the determined identity is transmitted, e.g. to an authorization controller who is interested in the identity of the person.

Figure 7:
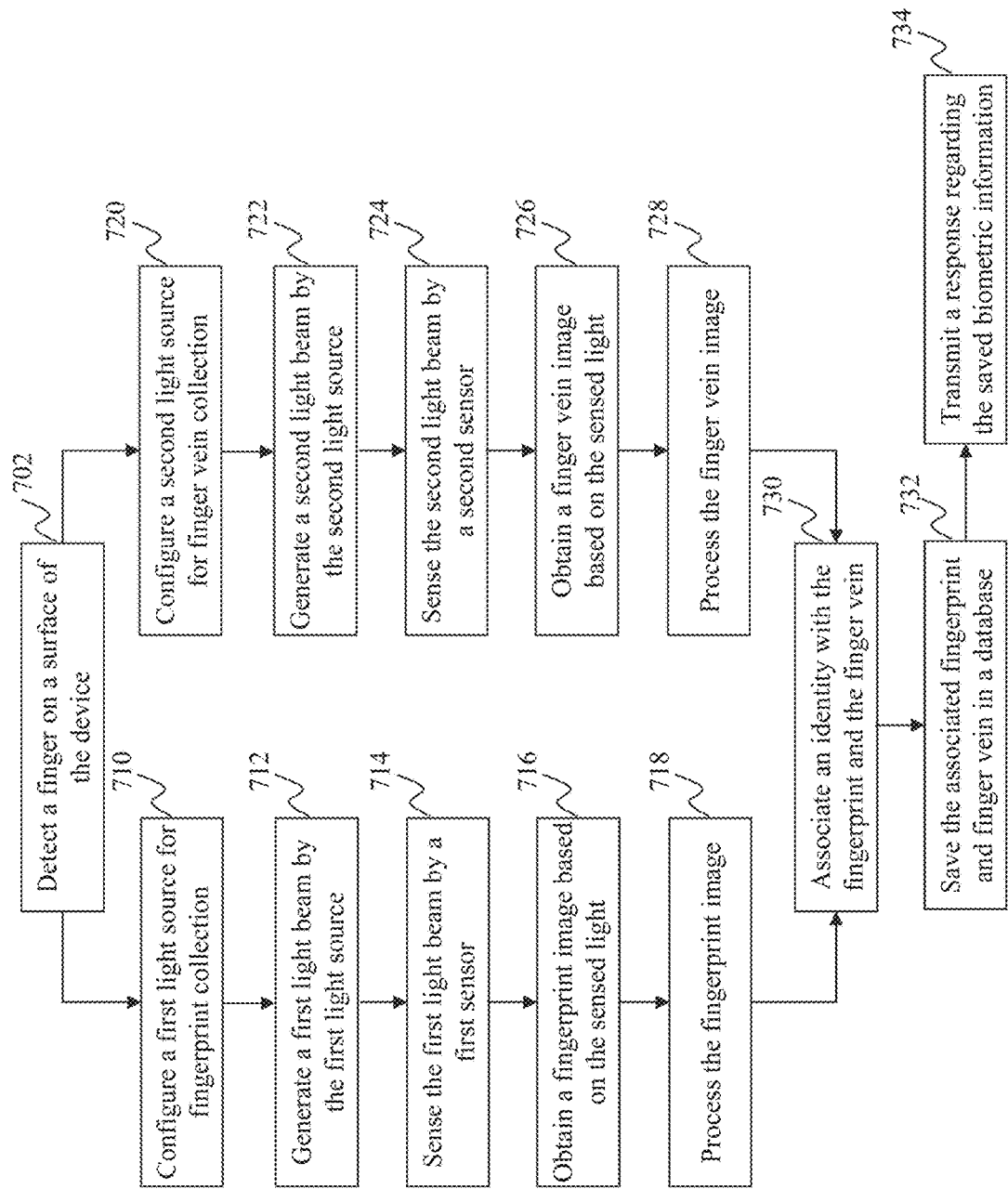
FIG. 7 is a flowchart of an exemplary process for biometric information recording, according to an embodiment of the present teaching.

FIG. 7 is a flowchart of an exemplary process for biometric information recording, according to an embodiment of the present teaching. In one example, the exemplary process in FIG. 7 may be performed by an exemplary device including the identification/verification module 500 shown in FIG. 5 when a biometric recording request is received from the authorization controller 410. Starting at 702, a finger is detected to be placed on a surface of the device. The process is then divided into two branches, where the two branches are performed separately.

The first branch is for fingerprint collection and processing. At 710, a first light source is configured for fingerprint collection. At 712, a first light beam is generated by the first light source according to the configuration. At 714, the first light beam is reflected by a fingerprint portion of the finger and is sensed by a first sensor. At 716, a fingerprint image is obtained based on the sensed light. At 718, the fingerprint image is processed to generate a fingerprint template. The first branch then merges to 730.

The second branch is for finger vein collection and processing. At 720, a second light source is configured for finger vein collection. At 722, a second light beam is generated by the second light source according to the configuration. At 724, the second light beam is scattered by the finger vein and is sensed by a second sensor. At 726, a finger vein image is obtained based on the sensed light. At 728, the finger vein image is processed to generate a characteristic finger vein image. The second branch then merges to 730.

At 730, an identity is associated with the fingerprint and the finger vein, where the identity is a known identity included in the biometric recording request received from the authorization controller 410. At 732, the fingerprint and finger vein associated with the identity are saved in a database. At 734, a response regarding the saved biometric information is transmitted, e.g. to an authorization controller who is interested in recording biometric information of the person with the known identity.

Figure 8:
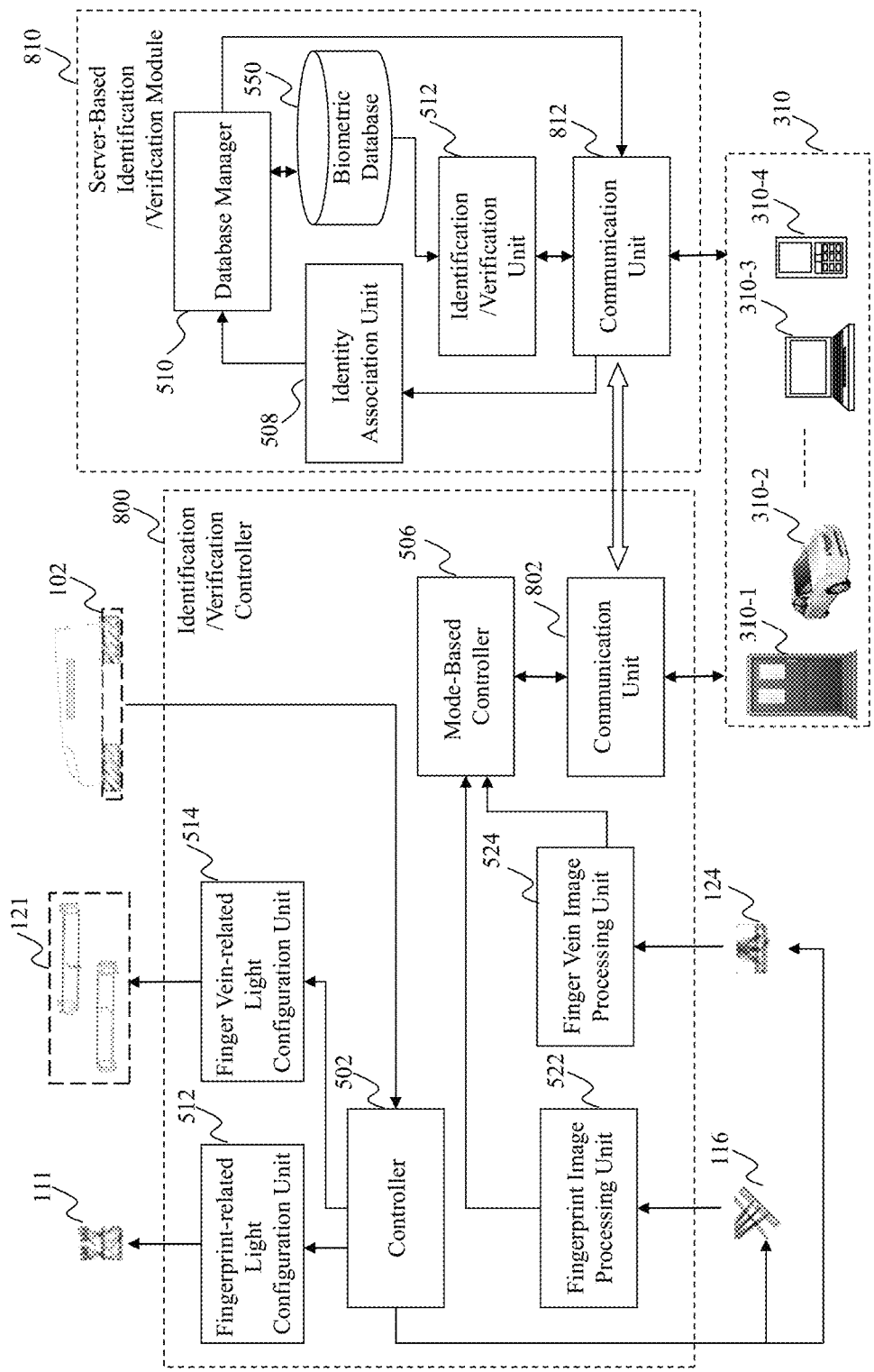
FIG. 8 illustrates an exemplary diagram of an identification/verification controller and a server-based identification/verification module, according to an embodiment of the present teaching.

FIG. 8 illustrates an exemplary diagram of an identification/verification controller 800 and a server-based identification/verification module 810, according to an embodiment of the present teaching. The 800 may be located in the identity recognition device 340 shown in FIG. 3; while the 810 may be located in the server 330 in FIG. 3. The components in the 800 and the 810 in this example are similar (in terms of their respective configuration and functionality) to the components in the identification/verification module 500 shown in FIG. 5, except that in this example some components from the identification/verification module 500 are now located in the 800, while other components from the identification/verification module 500 are now located in the 810. As discussed above, this application happens when the 810 is in the server 330 that is shared by a large group of people and can serve multiple identity recognition devices 340 associated with the same group of people, e.g., employees of a same company. In one embodiment, the application happens when a user wants to obtain access to a building, a car, a laptop or a mobile device that is shared by the same group of users in the company.

As shown in FIG. 8, the controller 502, the fingerprint-related light configuration unit 512, the finger vein-related light configuration unit 514, the fingerprint image processing unit 522, the finger vein image processing unit 524, and the mode-based controller 506 are located in the 800. The identity association unit 508, the database manager 510, the identification/verification unit 520, and the biometric database 550 are located in the 810. The 800 includes a communication unit 802 that can communicate with the 810 via a communication unit 812 in the 810. The 800 and the 810 can communicate with the authorization controllers 310 via the communication units 802 and 812, respectively, e.g. through the network 320 as shown in FIG. 3.

Figure 9:
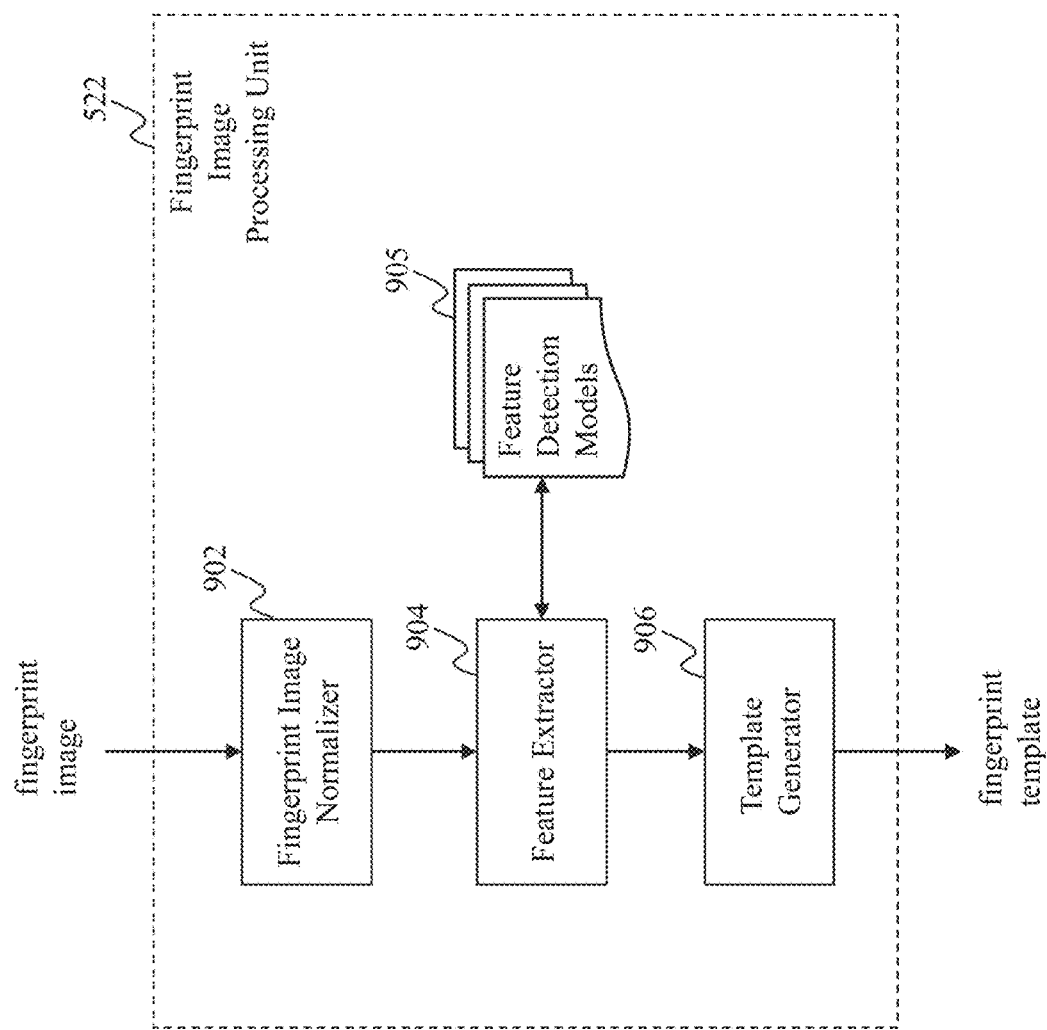
FIG. 9 illustrates an exemplary diagram of a fingerprint image processing unit in a system for user identification, according to an embodiment of the present teaching.

FIG. 9 illustrates an exemplary diagram of a fingerprint image processing unit 522 in a system for user identification, according to an embodiment of the present teaching. In one embodiment, the fingerprint image processing unit 522 may be located in the identification/verification module 500 in FIG. 5. In another embodiment, the fingerprint image processing unit 522 may be located in the 800 in FIG. 8. The fingerprint image processing unit 522 in this example includes a fingerprint image normalizer 902, a feature extractor 904, and a template generator 906.

The fingerprint image normalizer 902 in this example receives the fingerprint image, e.g. from the first sensor 116, and normalizes the fingerprint image. The feature extractor 904 in this example extracts features from the normalized fingerprint image. The features may include at least one of singular points, average density of the image ridge, and minutiae of the fingerprint image. The features can be extracted based on one or more feature detection models 905 stored in the fingerprint image processing unit 522. Each feature detection model defines a manner in which a feature is detected or verified. As an example, a detailed process of extracting features from a fingerprint image is described below.

For image processing of a fingerprint image, the system may use different parameters to represent different features in the fingerprint image. The fingerprint image can be represented by a two-dimensional matrix, with a width W and a height H. Each element of the matrix represents a corresponding pixel on the image. A pixel corresponding to row i and column j of the matrix has a gray scale $I_{i,j}$, which may be any number between 0 and 255.

A fingerprint image may include minutiae that are endpoints or bifurcation points on fingerprint ridges. A minutia can be represented by the following parameters (x, y, t, d, g, c). Axes x and y represent the minutia's position in the fingerprint image. Type t indicates whether the minutia is an endpoint or a bifurcation point. Direction d represents a direction of the minutia. If the minutia is an endpoint of a ridge, d represents a direction from the minutia to the ridge. If the minutia is a bifurcation point connecting two divergent ridges, d represents a direction from the minutia to a middle line of the two divergent ridges. Ridge density g represents an average density of ridges around the minutia. A larger gap between ridges can lead to a smaller ridge density. Ridge curvature c represents a changing rate of ridge direction d at the minutia.

A fingerprint image can be divided to smaller non-overlapping blocks. Each block has dimensions Size*Size. After calculating an average ridge direction for each block, the system can achieve a block direction map with dimensions (W/Size)*(H/Size). The block direction map illustrates global directions of the ridges. The system may store the block direction map for future matching. In addition, an unexpected direction value in the block direction map can represent a background portion, i.e. there is no fingerprint in this portion or the fingerprint quality is very poor in this portion.

A fingerprint image may also include some singular points. At a singular point, the ridge direction is not continuous. A singular point can be represented by the following parameters (x, y, t, d, g). Axes x and y represent the singular point's position in the fingerprint image. Type t indicates a type of singular points, which may be a core point, a dual core point, or a triangulation point. Direction d represents a direction such that when moving away from the singular point, this direction can induce a minimum change of ridge direction. Ridge density g represents an average density of ridges around the singular point.

According to the above parameter representations, a fingerprint image can be processed as below to generate a fingerprint template. First, the system filters the fingerprint image to smooth the image, according to the following equation:

$$R_{i,j} = \frac{\sum_{y=i-w}^{i+w} \sum_{x=j-w}^{j+w} I_{y,x}}{(w+1)^2} \quad (1)$$

where $I_{y,x}$ represents the original fingerprint image, $R_{i,j}$ represents a filtered fingerprint image, w=1 for a 3*3 filter.

The system may normalize the filtered fingerprint image according to the following equations:

$$R_{i,j}^N = \frac{255(I_{i,j} - \text{Min}_{i,j})}{\Delta_{i,j}} \quad (2)$$

$$\text{Min}_{i,j} = I_{i,j} - \text{Var}_{i,j}$$

$$\text{Max}_{i,j} = I_{i,j} + \text{Var}_{i,j}$$

$$\Delta_{i,j} = \text{Max}_{i,j} - \text{Min}_{i,j}$$

$$\text{Var}_{i,j} = \frac{\sum_{y=i-w}^{i+w} \sum_{x=j-w}^{j+w} |I_{y,x} - S_{y,x}|}{(w+1)^2}$$

where $I_{i,j}$ may equal $R_{i,j}$ in equation (1) above, $S_{y,x}$ represents an image generated by filtering the original fingerprint image with a 5*5 filter, w is a large number, e.g. 80, for Var calculation.

The system can detect singular points by calculating Poincare Index for each point on the block direction map described above. The Poincare Index for one point is calculated according to the following equations:

$$pindex'' = \frac{1}{\pi} \sum_{i=0}^{n} \tau(O_{(i+1) \bmod n} - O_i)$$

$$\tau(k) = \begin{cases} k, & \text{if } |k| < \frac{\pi}{2}, \\ \pi + k, & \text{if } |k| < \frac{\pi}{2}, \\ \pi - k, & \text{otherwise} \end{cases}$$

where n represents number of pixels around the point, $O_i$ represents direction of the i-th point. To ensure reliability, the system can first calculate the Poincare index with a radius of 1, i.e. making use of the eight points around. This Poincare index is referred as p1. If p1 is not zero, the system can calculate another Poincare index, p2, with a radius of 2, i.e. making use of the points on a further outside circle. If p1 and p2 are the same, the point is a singular point. For a singular point, it is a core point if p1=1; it is a triangulation point if p1=−1; and it is a dual core point if p1=2. If p2 and p1 are different, but p2>0 and p1>0, then the point is also a dual core singular point. The point is not a singular point in other situations.

Based on a normalized fingerprint image, the system can calculate ridge direction $O_{i,j}$ for each point (i,j) according to the following equations:

$$G_{i,j}^{xx} = (G_{i,j}^x)^2, \; G_{i,j}^{yy} = (G_{i,j}^y)^2, \; G_{i,j}^{xy} = G_{i,j}^x G_{i,j}^y$$

$$G_{i,j}^x = (I_{i-1,j+1} - I_{i-1,j-1}) + 4(I_{i,j+1} - I_{i,j-1}) + (I_{i+1,j+1} - I_{i+1,j-1})$$

$$G_{i,j}^y = (I_{i+1,j-1} - I_{i-1,j-1}) + 4(I_{i+1,j} - I_{i-1,j}) + (I_{i+1,j+1} - I_{i-1,j+1})$$

$$g_{i,j}^{xx} = \frac{\sum_{y=i-w}^{i+w} \sum_{x=j-w}^{j+w} G_{y,x}^{xx}}{(2w+1)^2}, \; g_{i,j}^{yy} = \frac{\sum_{y=i-w}^{i+w} \sum_{x=j-w}^{j+w} G_{y,x}^{yy}}{(2w+1)^2},$$

$$g_{i,j}^{xy} = \frac{\sum_{y=i-w}^{i+w} \sum_{x=j-w}^{j+w} G_{y,x}^{xy}}{(2w+1)^2}$$

$$O_{i,j} = \tan^{-1} \frac{2g_{i,j}^{xy}}{g_{i,j}^{xx} - g_{i,j}^{yy}}$$

where $I_{i,j}$ may equal $R_{i,j}^N$ in equation (2) above, w may be 15 or another number based on a practical situation. The system may further calculate a consistency $C_{i,j}$ of the ridge direction according to the following equations:

$$m_{i,j} = \sqrt{g_{i,j}^{xx} + g_{i,j}^{yy}}$$

$$C_{i,j} = \begin{cases} \frac{\sqrt{(g_{i,j}^{xx} - g_{i,j}^{yy})^2 + 4g_{i,j}^{xy2}}}{g_{i,j}^{xx} + g_{i,j}^{yy}}, & \text{if } m_{i,j} \geq \text{Threshold} \\ 0, & \text{otherwise} \end{cases}$$

where Threshold represents a predetermined threshold, $C_{i,j}=0$ indicates that the point falls into a background area of the fingerprint image. Based on the calculated $C_{i,j}$, the system can refine positions of the singular points previous identified. For example, a refined position can be determined based on a minimum $C_{i,j}$ around the original position of the singular point. The system then updates the position and direction for the singular point.

The system can enhance the normalized fingerprint image with a filter like below:

$$h(x, y, \theta) = \rho(x, y)\exp\left(-\frac{(x\cos\theta + y\sin\theta)^2}{\delta_1^2} - \frac{(x\sin\theta - y\cos\theta)^2}{\delta_2^2}\right)$$

$$\rho(x, y) = \begin{cases} a, & \text{if } x^2 + y^2 \leq r^2 \\ 0, & \text{otherwise} \end{cases}$$

where r represents an effective radius which may be 6; a represents an amplification parameter, which may be 1024; $\delta_1^2$ and $\delta_2^2$ are shape parameters for the filter, which can be 8 and 1; $\theta$ represents the modification direction of the filter. Using the above filter, the system may enhance the normalized fingerprint image according to the following equation:

$$R_{i,j}^E = \frac{\sum_{y=i-r}^{i+r} \sum_{x=j-r}^{j+r} h(x-i, y-j, O_{y,x}) I_{y,x}}{\sum_{y=i-r}^{i+r} \sum_{x=j-r}^{j+r} h(x-i, y-j, O_{y,x})}$$

where $I_{y,x}$ comes from in equation (2) above; $R_{i,j}^E$ represents the enhanced fingerprint image. To improve calculation speed, the system can pre-store h for all modification directions and pre-store the denominator in the above equation. Then, they can be retrieved directly for future calculations.

To calculate a ridge density map D, the system can use the following equations:

$$D_{i,j} = \frac{\sum_{y=i-w}^{i+w} \sum_{x=j-w}^{j+w} P_{y,x}}{\sum_{y=i-w}^{i+w} \sum_{x=j-w}^{j+w} C_{y,x}} \cdot \frac{255 Koef(O_{i,j})}{KoefP}$$

$$P_{i,j} = \begin{cases} 1, & \text{if } \sum_{y=i-w}^{i+w} \sum_{x=j-w}^{j+w} I_{y,x} \in [Threshold_{bottom}, Threshold_{top}] \\ & \text{and } [i, j] \text{ is not in the bad area} \\ 0, & \text{otherwise} \end{cases}$$

$$C_{i,j} = \begin{cases} 1, & [i, j] \text{ is not in the bad area} \\ 0, & \text{otherwise} \end{cases}$$

where $Koef(O_{i,j})$ and $KoefP$ are parameters that may vary based on directions; the bad area may include the background area. The system may remove noises of the ridge density map $D_{i,j}$ with a 33*33 filter.

The system then generate a binary image based on the enhanced fingerprint image, according to the following equation:

$$R_{i,j}^R = \begin{cases} 0, & \text{if } I_{i,j} < S_{i,j} \\ 255, & \text{otherwise} \end{cases}$$

where equals $I_{i,j}$ in equation $R_{i,j}^E$ above; $S_{i,j}$ represents an image generated by filtering the enhance fingerprint image with a 33*33 filter; and $R_{i,j}^B$ represents the binary fingerprint image.

Next, the system converts the binary image to a ridge map, where each ridge is as thin as one pixel. For example, regarding each black pixel point in the binary image, the system determines whether to change the point to white based on its surrounding eight points. If so, the black pixel is changed to white and the process moves on to the next pixel. The system repeats this process periodically until no black point needs to be changed on the entire image. A thinned image is thus generated.

In a binary image, there can be 256 possible situations for the surrounding eight points of a black pixel. As such, a table can be established to quickly determine whether to change the black pixel to white. The table is illustrated below:

{0,0,0,0,0,0,1,0,0,0,0,0,0,1,1,0,0,0,0,0,0,0,0,0,0,0,1,0, 1,1,0,0,0,0,0,0,0,0,0,0,0,0, 0,0,0,0,0,0,0,0,0,0,0,1,0,0, 0,1,0,1,1,0,0,0,1,0,0,0,0,0,0,0,0,0,0,0,0,0,0,0,0,0, 1,0, 0,0,0,0,0,0,1,0,1,0,0,0,0,0,0,0,0,0,0,0,1,0,0,0,0, 0,0,0,1,0,0,0,1,0,1,0,0,0,0,1,0,0,0,1, 0,0,0,0,0,0,0,1,0,0, 0,0,0,0,0,0,0,0,0,0,0,0,0,1,0,0,0,0,0,0,0,0,0,0,0,0,0,0, 0,0,0,0,0,0,0, 0,0,0,0,0,0,0,0,0,1,0,1,0,1,0,0,0,0,0,0,0,0, 0,0,0,0,1,0,0,0,0,0,0,0,1,0,0,0,0,0,0,0,1,1,0,1, 0,0,0,0,0, 0,0,0,0,0,0,0,1,0,0,0,0,0,0,0,0,1,0,0,0,1,0,1,0} where 1 indicates the black pixel should be changed to white, 0 indicates no change is needed for the black pixel. As an example to use the above table, a black pixel has its eight surrounding pixels listed below (counter-clockwise starting from the upper left corner): white, white, white, black, white, black, black, white. A corresponding index for the black pixel is 22, which is 00010110 in binary system (black is 1 and white is 0 here). Because the 22-th number in the above table is 0, there is no need to change this black pixel. In one embodiment of using tables like above, 0 indicates the black pixel should be changed to white, and 1 indicates no change is needed for the black pixel.

To extract minutiae accurately, the system removes noises from the fingerprint image. The system scans the thinned fingerprint image and monitors ridges. If a distance (measured by pixels) from one end to another of a ridge line is smaller than a predetermined threshold, then the system can remove this ridge as a noise ridge. Then, the system extracts the minutiae as below. For any black point in the image, the system scans clockwise the surrounding eight points, starting from one of the eight and ending with the same one. If the color changes twice, this black point is an endpoint minutia. If the color changes more than four times, this black point is a bifurcation point minutia. The black point is not minutia in other cases.

A ridge curvature c of a minutia can be calculated based on differences between the ridge direction at the minutia and the ridge directions at points around the minutia. Thus, the ridge curvature c of a minutia can be calculated according to the following equation:

$$\sum_{\substack{x^2+y^2<r^2 \\ x^2+y^2 \neq 0}} |O_{i+x,j+y} - O_{i,j}|$$

where r is a constant radius, which may be 10.

The system may further validate the minutiae as below. For a given minutia, if its distance to another minutia is less than D1 (a predetermined threshold), the system deletes the given minutia. If two endpoint minutiae have opposite directions and the distance between them is less than D2 (a predetermined threshold), the system deletes both of them. If an endpoint minutia and a bifurcation point minutia have opposite directions and the distance between them is less than D3 (a predetermined threshold), the system deletes both of them. If a minutia has a direction pointing outside and its distance to the bad area is less than D4 (a predetermined threshold), the system deletes the minutia. The values of D1, D2, D3, and D4 may be determined based on experience.

The template generator 906 in this example generates a fingerprint template based on the extracted features and sends the fingerprint template to the mode-based controller 506. The fingerprint template may include information about the above mentioned features: e.g. minutiae, singular points, or block direction map, etc.

Figure 10:
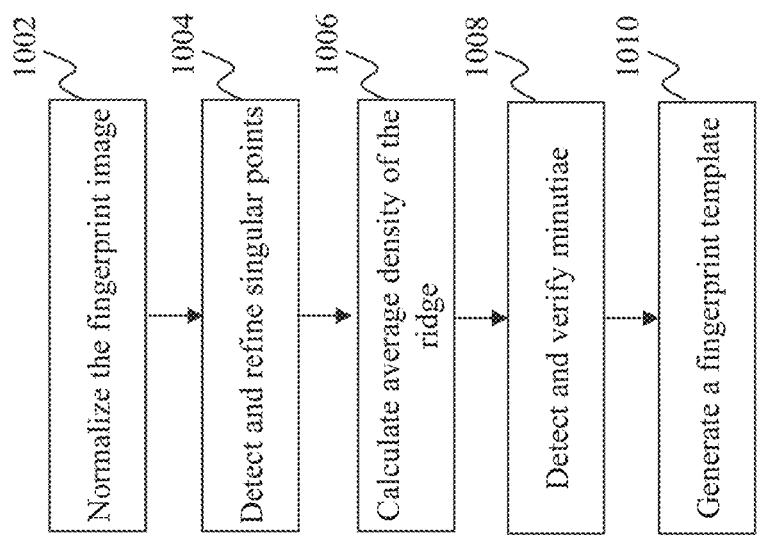
FIG. 10 is a flowchart of an exemplary process performed by a fingerprint image processing unit, according to an embodiment of the present teaching.

FIG. 10 is a flowchart of an exemplary process performed by a fingerprint image processing unit, e.g. the fingerprint image processing unit 522 in FIG. 9, according to an embodiment of the present teaching. Starting at 1002, the fingerprint image is normalized. At 1004, singular points are detected and refined. At 1006, average density of the ridge in the fingerprint image is calculated. At 1008, minutiae in the fingerprint image are detected and verified. At 1010, a fingerprint template is generated, e.g. based on the detected singular points and minutiae and the average density of the ridge.

Based on a sample fingerprint template, the system may find a match from the biometric database 550 by comparing the sample fingerprint template with a plurality of fingerprint templates in the database. For each comparison between two fingerprint templates, a matching score can be determined to represent a similarity between the two templates. As an example, a detailed process of comparing two fingerprint templates is described below.

The system compares two fingerprint templates by comparing corresponding features of the two fingerprint templates. For minutiae comparisons, the system groups the minutiae into minutia pairs. A minutia pair $(m_i, m_j)$ can be represented by the following parameters: $d_{ij}$ represents the length of a line segment connecting $m_i$ and $m_j$, i.e. the distance between two minutiae; $a_i$ and $b_j$ represent intersection angles between the line segment and the directions of the two minutiae respectively; and $u_{ij}$ represents the direction of the line segment. The system compares two minutia pairs based on these parameters. For a minutia pair, the quantities including $d_{ij}$, $a_i$, $b_j$, and the two minutiae's type t, curvature c, ridge density g, are invariant to translation or rotation. Thus, these quantities can be compared to determine a similarity between two minutia pairs.

For a minutia pair $(m_{i1}, m_{j1})$ from a sample fingerprint template and another minutia pair $(m_{i2}, m_{j2})$ from a stored fingerprint template, the system can calculate their similarity according to the following equation:

$$D = cof_1 |d_{i_1 j_1} - d_{i_2 j_2}| + $$
$$cof_2(|a_{i_1} - a_{i_2}| + |b_{j_1} - b_{j_2}|) + cof_3(|c_{i_1} - c_{i_2}| + |c_{j_1} - c_{j_2}|) + $$
$$cof_4(|g_{i_1} - g_{i_2}| + |g_{j_1} - g_{j_2}|) + cof_5(|t_{i_1} - t_{i_2}| + |t_{j_1} + t_{j_2}|)$$

where $cof_1$, $cof_2$, $cof_3$, $cof_4$, $cof_5$ are positive constants that may be pre-determined based on experience; d, a, b, c, g are defined as before; t represents minutia type (1 for bifurcation point, 0 for endpoint). When D is less than a predetermined threshold ThresholdD, the system determines a match between the two minutia pairs. To reduce comparisons of minutia pairs, the system may focus on comparing minutia pairs whose $d_{ij}$ are within a given range. To further improve speed, the system may order the minutia pairs in each fingerprint template according to $d_{ij}$. Then, a minutia pair with length d may only be compared with minutia pairs having similar lengths.

After removing unmatched minutia pairs, the system can achieve a list of matched minutia pairs:

$$U = \{\mu_{i_1 j_1, i_2 j_2} = (l_{i_1 j_1}, l_{i_2 j_2}, S_{i_1 j_1, i_2 j_2}) \mid D_{i_1 j_1, i_2 j_2} < ThresholdD\}$$

$$S_{i_1 j_1, i_2 j_2} = 1 - \frac{D_{i_1 j_1, i_2 j_2}}{ThresholdD}$$

where $l_{i1j1}$ represents two minutiae ($m_{i1}$, $m_{j1}$) and their connections from a sample fingerprint template, $l_{i2j2}$ represents two minutiae ($m_{i2}$, $m_{j2}$) and their connections from a stored fingerprint template, D represents a distance between these two pairs of minutiae, S represents a similarity between the two pairs of minutiae.

To calculate a similarity between the two fingerprint templates, the system can align the two fingerprint templates. First, the system determines the rotation angle from one template to the other. For example, the system sets a one-dimensional array $\{H_d | 0 \leq d < 360\}$, its subscript represents from a degree between 0 and 359. Each $H_d$ is calculated as follows:

$$H_d = \sum_{\mu_{i_1 j_1 i_2 j_2} \in U} S_{i_1 j_1 i_2 j_2}(\sigma_d(d_{i_1} - d_{i_2}) + \sigma_d(d_{j_1} - d_{j_2}))$$

where $\sigma_d$ is a unit impulse function having value 1 at d and value 0 at other places. Thus, $\{H_d\}$ is a histogram representing angle differences between corresponding minutiae from all matched minutia pairs. The maximum point in the array corresponds to the rotation angle θ according to which one template needs to be rotated to align with the other.

According to the rotation angle θ, the system rotates every angle parameters in one fingerprint template, including the minutiae angle, angle of singular points, etc., e.g. $(d_i + \theta) \mod 360 \rightarrow d_i$.

According to $\{H_d\}$, for any matched minutia pair, if an angle difference between two corresponding minutiae is greater than a predetermined value, the system can remove the matched minutia pair from the list U.

Similarly, the system may calculate the histograms for coordinate differences. For example, the system sets two one-dimensional arrays $\{HX_{dx}\}$ and $\{HY_{dy}\}$ according to the following equations:

$$\{HX_{dx} \mid -MaxDim_{x_1} \leq dx \leq MaxDim_{x_2}\}$$

$$HX_{dx} = \sum_{\mu_{i_1 j_1 i_2 j_2} \in U} S_{i_1 j_1 i_2 j_2} \frac{\sigma_{dx}(x_{i_1} - x_{i_2}) + \sigma_{dx}(x_{j_1} - x_{j_2})}{2}$$

$$\{HY_{dy} \mid -MaxDim_{y_1} \leq dy \leq MaxDim_{y_2}\}$$

$$HY_{dy} = \sum_{\mu_{i_1 j_1 i_2 j_2} \in U} S_{i_1 j_1 i_2 j_2} \frac{\sigma_{dy}(y_{i_1} - y_{i_2}) + \sigma_{dy}(y_{j_1} - y_{j_2})}{2}$$

Thus, $\{HX_{dx}\}$ and $\{HY_{dy}\}$ are statistical histograms representing coordinate differences (along axes x and y respectively) between corresponding minutiae from all matched minutia pairs; $MaxDim_{x1}$, $MaxDim_{x2}$, $MaxDim_{y1}$, and $MaxDim_{y2}$ represent maximum dimensions along axes x and y respectively, and may be determined based on experience.

The maximum points in the two arrays correspond to the needed amount of shift $(x_0, y_0)$ between the two templates, after the two templates are aligned by rotation. In one embodiment, $\text{MaxDim}_{x1}$, $\text{MaxDim}_{x2}$, $\text{MaxDim}_{y2}$, and $\text{MaxDim}_{y2}$ represent a same number.

According to needed amount of shift $(x_0, y_0)$, the system shifts every position parameters in one fingerprint template, including minutia coordinates, singular point coordinates, location of block direction map, etc. Thus, the two fingerprint templates are completely aligned.

According to $\{H_{dx}\}$ and $\{HY_{dy}\}$, for any matched minutia pair, if a coordinate difference between two corresponding minutiae is greater than a predetermined value, the system can remove the matched minutia pair from the list U. Then, the similarities of the remaining matched minutia pairs can be added up to calculate a final similarity $S_m$ for minutia comparison.

At this point, since the two fingerprint templates are completed aligned, the system can simply calculate similarity for other features. For example, a similarity $S_s$ for singular points can be achieved by comparing each pair of singular points' position, orientation and type, and summing up the resulting similarities. A similarity $S_g$ for average ridge density can be achieved by calculating a difference between two ridge densities and taking a reciprocal of the difference. A similarity $S_d$ for block direction map can be achieved by calculating direction differences in the common part of the two templates' effective areas, and taking a reciprocal of the average cumulative differences.

Based on the above calculated similarities, the system can calculate a final similarity between the two fingerprint templates according to the following equation:

$$S = k_m S_m + k_s S_s + k_g S_g + k_d S_d$$

where, $k_m$, $k_s$, $k_g$, $k_d$ are weight coefficients for various feature similarities.

To speed up the recognition process, the system may pre-order the fingerprint template in the database based on the average ridge density G. Then during fingerprint matching process, the system can give priority to the fingerprint templates whose average ridge densities are closest to that of the sample fingerprint template.

Figure 11:
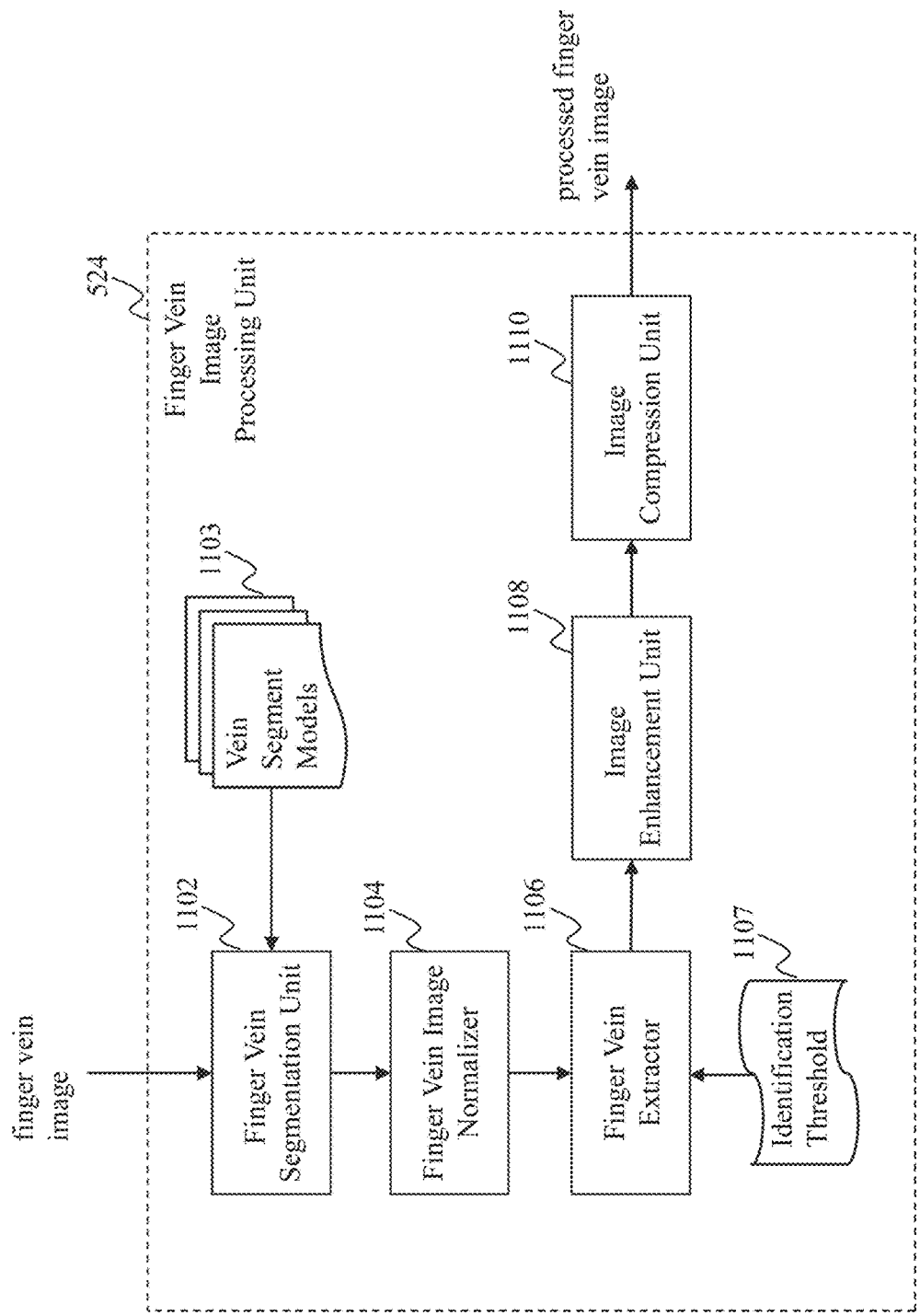
FIG. 11 illustrates an exemplary diagram of a finger vein image processing unit in a system for user identification, according to an embodiment of the present teaching.

FIG. 11 illustrates an exemplary diagram of a finger vein image processing unit 524 in a system for user identification, according to an embodiment of the present teaching. In one embodiment, the finger vein image processing unit 524 may be located in the identification/verification module 500 in FIG. 5. In another embodiment, the finger vein image processing unit 524 may be located in the 800 in FIG. 8. The finger vein image processing unit 524 in this example includes a finger vein segmentation unit 1102, a finger vein image normalizer 1104, a finger vein extractor 1106, an image enhancement unit 1108, and an image compression unit 1110.

The finger vein segmentation unit 1102 in this example segments a region illustrating a vein from the finger vein image, based on one of the vein segment models 1103 stored in the finger vein image processing unit 524. Each vein segment model 1103 defines a manner in which a region of vein is segmented. For example, according to one vein segment model, a region of vein is determined by removing portions of the finger vein image when there is no blood vessel in the portions and the portions are located at the outer edge of the finger vein image.

The finger vein image normalizer 1104 in this example normalizes geometric features of the finger vein image so that the image has a normalized shape, size, and direction. For example, an affine transformation can be used by the finger vein image normalizer 1104 to transform the finger vein image to have a normalized shape, size, and direction. The finger vein image normalizer 1104 also normalizes gray level of the finger vein image to bring the gray level of the image into a normalized range. Therefore, the finger vein image has a normalized geometric features and gray level, same as the finger vein images stored in the database 550.

The finger vein extractor 1106 in this example extracts one or more portions of the image representing blood vessels from the normalized finger vein image. For example, the finger vein extractor 1106 may determine, for each pixel on the normalized image, whether the pixel represents a portion of a blood vessel based on an identification threshold 1107 stored in the finger vein image processing unit 524. In one embodiment, the identification threshold 1107 defines a minimum level of gray scale at which a pixel can be determined to represent a blood vessel. The identification threshold 1107 may be dynamically modified by an expert, or determined based on a machine learning process. The finger vein extractor 1106 generates a binary (e.g. black-and-white) image based on the extracted portions representing blood vessels. For example, if a pixel is determined to represent a portion of a blood vessel, the pixel is assigned a gray scale value of color black; otherwise, the pixel is assigned a gray scale value of color white.

The image enhancement unit 1108 in this example enhances the finger vein image by removing image noises from the finger vein image. The image noises may include random variation of brightness or grayscale information in the finger vein image.

The first light source 1110 in this example compresses the finger vein image to a standard size, so that a characteristic finger vein image is generated, and sent to, e.g., the mode-based controller 506.

Figure 12:
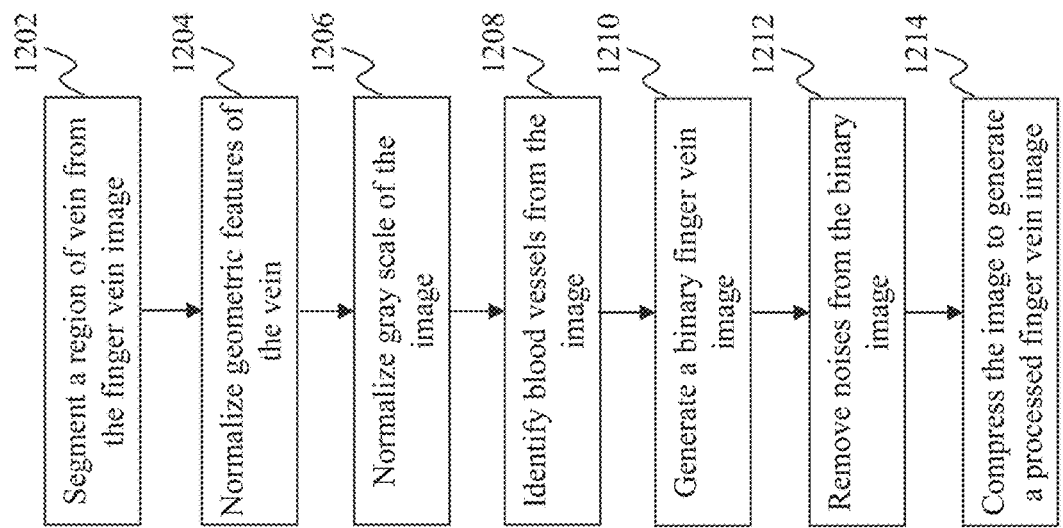
FIG. 12 is a flowchart of an exemplary process performed by a finger vein image processing unit, according to an embodiment of the present teaching.

FIG. 12 is a flowchart of an exemplary process performed by a finger vein image processing unit, e.g. the finger vein image processing unit 524 in FIG. 11, according to an embodiment of the present teaching. Starting at 1202, a region of vein is segmented from the finger vein image. At 1204, geometric features of the vein are normalized. At 1206, gray scale of the image is normalized. At 1208, blood vessels are identified from the image. At 1210, a binary finger vein image is generated. At 1212, noises are removed from the binary image. At 1214, the image is compressed to generate a characteristic finger vein image.

The system may compare the characteristic finger vein image with each of a plurality of candidate characteristic finger vein images stored in a database. An exemplary process is described below. First, the system determines a plurality of offset values. For each of the plurality of offset values, the system aligns the characteristic finger vein image with the candidate characteristic finger vein image based on the next offset value. For each of the plurality of offset values, the system may compute a matching score associated with the offset value based on a match between the characteristic finger vein image and the candidate characteristic finger vein image aligned using the offset value. Then the system selects a matching score from a plurality of matching scores corresponding to matches between the characteristic finger vein image and the candidate characteristic finger vein image using the plurality of offset values. Finally, the system designates the selected matching score as a confidence score of the candidate characteristic finger vein image.

Figure 13:
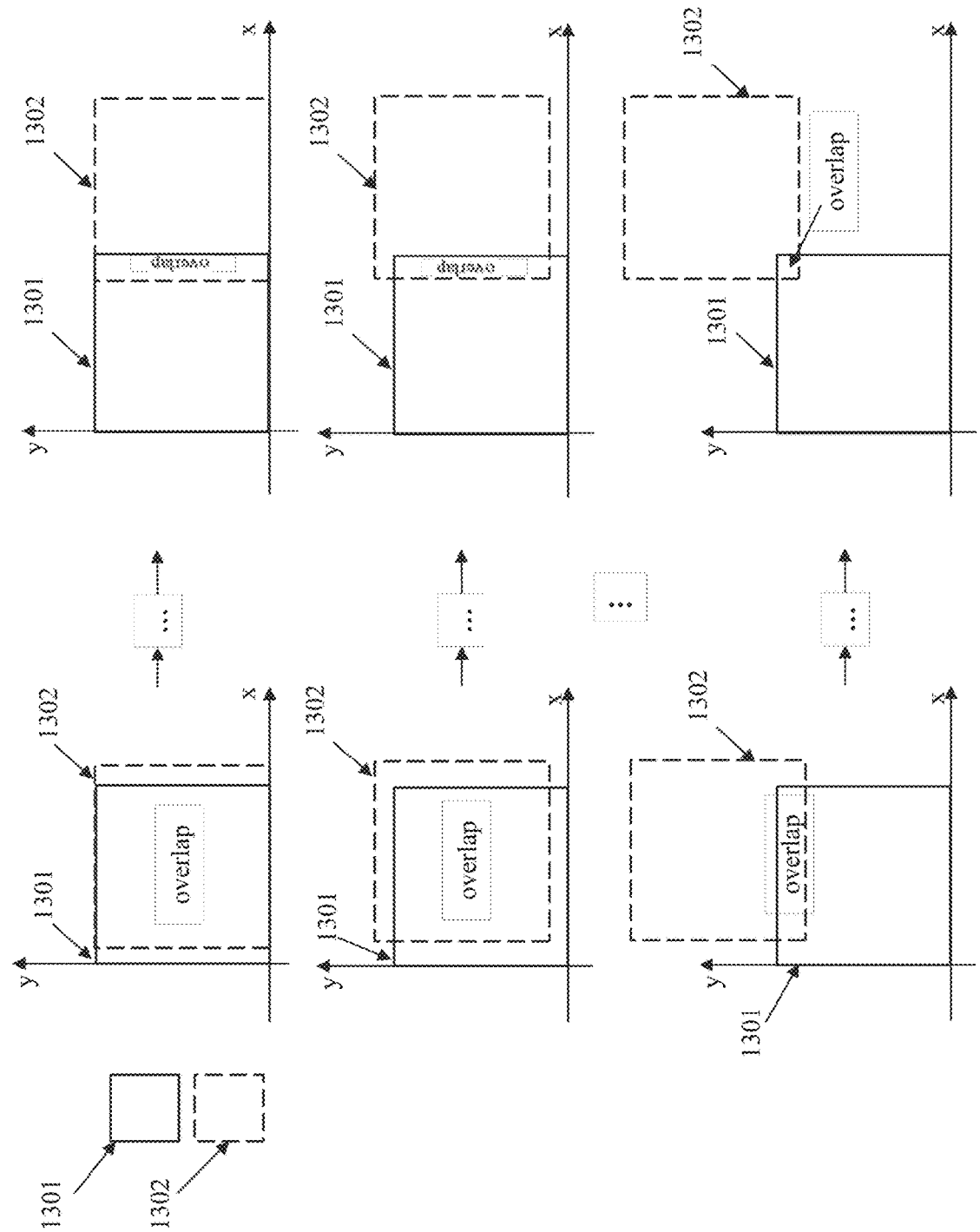
FIG. 13 illustrates a process for comparing two finger vein images for user identification, according to an embodiment of the present teaching.

FIG. 13 illustrates a detailed process for comparing two finger vein images for user identification, according to an embodiment of the present teaching. As discussed above, the characteristic finger vein image is compared with a pre-stored finger vein image in a database for user identification or verification. In one embodiment, as shown in FIG. 13, the characteristic finger vein image 1301 is compared with a pre-stored finger vein image 1302 in a database for a plurality of times. Because both the characteristic finger vein image 1301 and the pre-stored finger vein image 1302 were processed in the same manner, they should have the same size and shape, as shown in FIG. 13.

A first comparison is performed when image 1301 is entirely overlapped by image 1302, to generate a score S1-1. A second comparison is performed when image 1302 is shifted for a given distance (e.g. 1/20 of the width of image) along the x-axis, while position of image 1301 is fixed, to generate a score S2-1. A third comparison is performed when image 702 is shifted for an additional given distance (e.g. another 1/20 of the width of image) along the x-axis, while position of image 1301 is still fixed, to generate a score S3-1. This process goes so on and so forth for, e.g., 20 times to generate scores S1-1, S2-1 . . . S20-1.

Then, with respect to each of the above 20 steps, a comparison is performed after image 1302 is shifted for a given distance (e.g. 1/20 of the height of image) along the y-axis, while position of image 1301 is fixed, to generate 20 scores S1-2, S2-2, . . . S20-2. Another 20 comparisons are performed when image 1302 is shifted for an additional given distance (e.g. 1/20 of the height of image) along the y-axis, while image 1301 is fixed, to generate another 20 scores S1-3, S2-3 . . . S20-3. The process goes so on and so forth until 400 scores S1-1, S2-1, . . . S20-1, S1-2, S2-2, . . . S20-2, . . . , S1-20, S2-20, . . . S20-20 are all generated.

Based on the above comparison results, a maximum score among the 400 scores is selected (referred as $S_{max}$). The system determines that there is a match between the characteristic finger vein image 1301 and the pre-stored finger vein image 1302 if $S_{max}$ is greater than or equal to a predetermined threshold. The system determines that there is not a match between the characteristic finger vein image 1301 and the pre-stored finger vein image 1302 if $S_{max}$ is less than the predetermined threshold.

Figure 14:
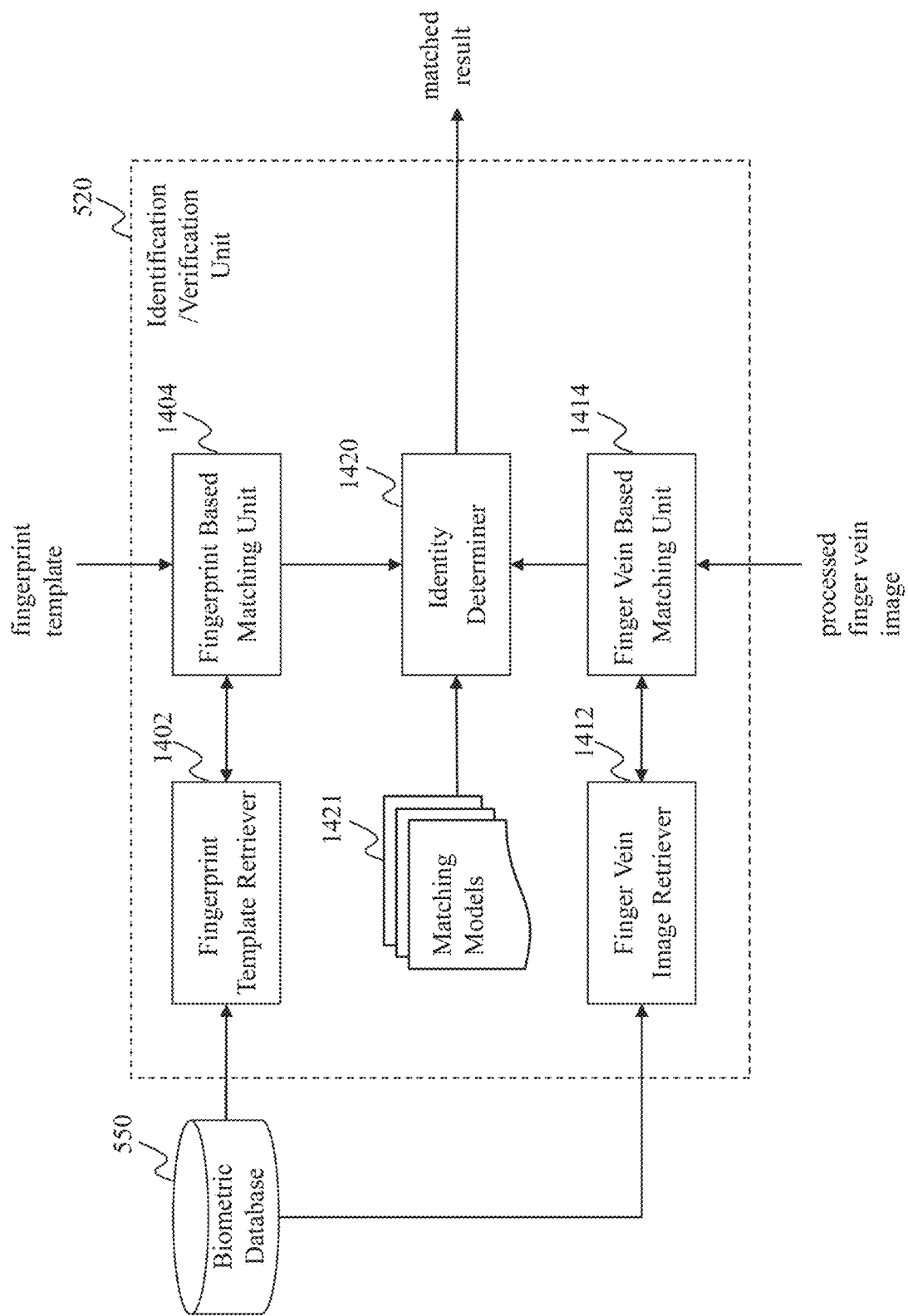
FIG. 14 illustrates an exemplary diagram of an identification/verification unit in a system for user identification, according to an embodiment of the present teaching.

FIG. 14 illustrates an exemplary diagram of an identification/verification unit 520 in a system for user identification, according to an embodiment of the present teaching. In one embodiment, the identification/verification unit 520 may be located in the identification/verification module 500 in FIG. 5. In another embodiment, the identification/verification unit 520 may be located in the 810 in FIG. 8. The identification/verification unit 520 in this example includes a fingerprint template retriever 1402, a fingerprint based matching unit 1404, a finger vein image retriever 1412, a finger vein based matching unit 1414, and an identity determiner 1420.

The fingerprint based matching unit 1404 in this example receives a fingerprint template and some related information from the mode-based controller 506. The related information may include whether this is for user identification without known identity or for user verification with a user-provided identity. The fingerprint based matching unit 1404 may then inform the fingerprint template retriever 1402 to retrieve one or more fingerprint templates from the biometric database 550.

The fingerprint template retriever 1402 in this example retrieves the one or more fingerprint templates from the biometric database 550, according to instructions received from the fingerprint based matching unit 1404. In one example, the identification/verification unit 520 works for user identification. The fingerprint based matching unit 1404 may send an instruction to the fingerprint template retriever 1402 to retrieve fingerprint templates associated with identities from the biometric database 550 according to an order based on a frequency of matching associated with each identity. For example, if a first identity in the biometric database 550 has been matched more frequently than a second identity in the biometric database 550, the first identity should be checked before the second identity. Accordingly, the fingerprint template associated with the first identity is retrieved before that associated with the second identity. Alternative, the fingerprint based matching unit 1404 may send an instruction to the fingerprint template retriever 1402 to retrieve fingerprint templates associated with identities from the biometric database 550 according to an alphabetic order of the identities.

In another example, the identification/verification unit 520 works for user verification with a user-provided identity. The fingerprint based matching unit 1404 may send an instruction to the fingerprint template retriever 1402 to retrieve the fingerprint template associated with the user-provided identity from the biometric database 550. In one case, the user-provided identity has multiple matches in the biometric database 550. For example, the user provided a name John, and there may be multiple identities in the biometric database 550 that include the name John. In this case, the fingerprint based matching unit 1404 may send an instruction to the fingerprint template retriever 1402 to retrieve the fingerprint templates associated with the multiple identities that include the name John. If there is no match after that, the fingerprint based matching unit 1404 may send an instruction to the fingerprint template retriever 1402 to retrieve the fingerprint templates associated with the identities that include a name similar to John, e.g., Johnson or Johnny.

The fingerprint based matching unit 1404 compares the fingerprint template received from the mode-based controller 506 with each retrieved fingerprint template to generate a comparison result with a confidence score. The confidence score indicates how likely the fingerprint template matches the retrieved fingerprint template associated with an identity. In one example, the confidence score is generated based on the matching score that represents a similarity between the two templates. The confidence score can be any real number or percentage number representing a degree of matching between two fingerprint templates.

If the confidence score is larger than a pre-determined threshold, the identity is determined based on the comparison. In one example, the fingerprint based matching unit 1404 performs the comparisons until a first identity is determined. In another example, the fingerprint based matching unit 1404 performs the comparisons through all the fingerprint templates in the biometric database 550 to determine one or more identities each with a confidence score higher than the pre-determined threshold. The fingerprint based matching unit 1404 sends the comparison results to the identity determiner 1420 for identity determination.

The finger vein based matching unit 1414 in this example receives a characteristic finger vein image and some related information from the mode-based controller 506. The related information may include whether this is for user identification without known identity or for user verification with a user-provided identity. The finger vein based matching unit 1414 may then inform the finger vein image retriever 1412 to retrieve one or more finger vein images from the biometric database 550.

The finger vein image retriever 1412 in this example retrieves the one or more finger vein images from the biometric database 550, according to instructions received from the finger vein based matching unit 1414. In one example, the identification/verification unit 520 works for user identification. The finger vein based matching unit 1414 may send an instruction to the finger vein image retriever 1412 to retrieve finger vein images associated with identities from the biometric database 550. The finger vein image retriever 1412 can retrieve the finger vein images associated with identities according to an order based on a frequency of matching associated with each identity. For example, if a first identity in the biometric database 550 has been matched more frequently than a second identity in the biometric database 550, the first identity should be checked before the second identity. Thus, the finger vein image associated with the first identity is retrieved before that associated with the second identity. Alternative, the finger vein based matching unit 1414 may send an instruction to the finger vein image retriever 1412 to retrieve finger vein images associated with identities from the biometric database 550 according to an alphabetic order of the identities.

In another example, the identification/verification unit 520 works for user verification with a user-provided identity. The finger vein based matching unit 1414 may send an instruction to the finger vein image retriever 1412 to retrieve the finger vein image associated with the user-provided identity from the biometric database 550. In one case, the user-provided identity has multiple matches in the biometric database 550. For example, the user provided a name John, while there are multiple identities in the biometric database 550 that include the name John. The finger vein based matching unit 1414 may send an instruction to the finger vein image retriever 1412 to retrieve the finger vein images associated with the multiple identities that include the name John. If there is no match after that, the finger vein based matching unit 1414 may send an instruction to the finger vein image retriever 1412 to retrieve the finger vein images associated with the identities that include a name similar to John, e.g. Johnson or Johnny.

The finger vein based matching unit 1414 compares the characteristic finger vein image received from the mode-based controller 506 with each retrieved finger vein image to generate a comparison result with a confidence score. The confidence score indicates how likely the characteristic finger vein image matches the retrieved finger vein image associated with an identity. The confidence score can be any real number or percentage number representing a degree of matching between two finger vein images.

If the confidence score is larger than a pre-determined threshold, the identity is determined based on the comparison. In one example, the finger vein based matching unit 1414 performs the comparisons until a first identity is determined. In another example, the finger vein based matching unit 1414 performs the comparisons through all the finger vein images in the biometric database 550 to determine one or more identities each with a confidence score higher than the pre-determined threshold. The finger vein based matching unit 1414 sends the comparison results to the identity determiner 1420 for identity determination.

In one embodiment, the fingerprint template retriever 1402 and the finger vein image retriever 1412 can communicate and align with each other so that a pair of fingerprint template and finger vein image associated with an identity is retrieved together by the fingerprint template retriever 1402 and the finger vein image retriever 1412 respectively.

The identity determiner 1420 in this example determines an identity based on the comparison results from the fingerprint based matching unit 1404 and the finger vein based matching unit 1414, in accordance with one of the matching models 1421 stored in the identification/verification unit 520. Each matching model 1421 may determine a manner in which an identity is determined. Each matching model 1421 may include a pre-determined criterion to be used for selecting one or more candidates. Different matching models can be selected in various embodiments.

In accordance with a first embodiment, an identity of a person is determined to be a known identity if the characteristic finger vein image matches a finger vein image associated with the known identity in the database and the fingerprint template matches a fingerprint template associated with the same known identity in the database.

If there are multiple such known identities, the identity determiner 1420 may identify the person as one of such known identities based on a combination of their respective confidence scores, in accordance with different matching models. For an identity having two confidence scores, the combination may be a sum of, a weighted average of, a maximum of, or a minimum of the two confidence scores. For example, there are in total three identities A, B, and C determined in accordance with the first embodiment. Identity A has a confidence score 0.8 for fingerprint and a confidence score 0.8 for finger vein. Identity B has a confidence score 0.75 for fingerprint and a confidence score 0.8 for finger vein. Identity C has a confidence score 0.9 for fingerprint and a confidence score 0.65 for finger vein. In this case, the identity determiner 1420 may identify the person as: (a) identity A if determined based on highest sum; (b) identity B if determined based on highest minimum; or (c) identity C if determined based on highest maximum.

If there are still multiple identities after considering a combination of confidence scores, the person may be identified from such identities based on either one of the confidence scores. Referring to the above example, if identity C has a confidence score 0.9 for fingerprint and a confidence score 0.7 for finger vein, identities A and C will have the same sum (1.6) of confidence scores. In this case, besides considering other combinations, the identity determiner 1420 may identify the person as identity A rather than identity C, because A has higher confidence score for finger vein than C and because finger vein is more difficult to forge than fingerprint.

In accordance with a second embodiment, an identity of a person is determined to be a known identity if either the characteristic finger vein image matches a finger vein image associated with the known identity in the database or the fingerprint template matches a fingerprint template associated with the same known identity in the database.

If there are multiple such known identities, the identity determiner 1420 may identify the person as one of such known identities based on their respective confidence scores. If any one of such known identities is in both matching results, the identity determiner 1420 may determine a combination of the confidence scores, according to different matching models. For an identity having two confidence scores, the combination may be a sum of, a weighted average of, a maximum of, or a minimum of the two confidence scores. For example, there are in total three identities A, B, and C determined in accordance with the second embodiment. Identity A has a confidence score 0.75 for fingerprint and no confidence score for finger vein. Identity B has no confidence score for fingerprint but have a confidence score 0.8 for finger vein. Identity C has a confidence score 0.65 for fingerprint and a confidence score 0.35 for finger vein. In this case, the identity determiner

1420 may identify the person as: (a) identity B if determined based on highest maximum; or (b) identity C if determined based on highest sum.

If there are still multiple identities after considering a combination of confidence scores, the person may be identified from such identities based on either one of the confidence scores. Referring to the above example, if identity C has a confidence score 0.45 for fingerprint and a confidence score 0.35 for finger vein, identities B and C will have the same sum (0.8) of confidence scores. In this case, besides considering other combinations, the identity determiner 1420 may identify the person as identity B rather than identity C, because B has higher confidence score for finger vein than C and because finger vein is more difficult to forge than fingerprint.

In accordance with a third embodiment, a person is first identified as an identity having highest confidence score for fingerprint. If there are multiple identities having the same highest confidence score for fingerprint, the person is then identified as the identity having highest confidence score for finger vein among the multiple identities.

In accordance with a fourth embodiment, a person is first identified as an identity having highest confidence score for finger vein. If there are multiple identities having the same highest confidence score for finger vein, the person is then identified as the identity having highest confidence score for fingerprint among the multiple identities.

For any matching model in any embodiment, if there are multiple identities having the same two confidence scores, the identity determiner 1420 may report the multiple identities together. In this situation, the system may instruct the user to place the finger again or place another finger for identification.

The matching model utilized by the identity determiner 1420 may be determined based on a tradeoff between security and efficiency. In one example, during business hours, lots of people want to access a building belonging to a big company. Then, efficiency is more important than security. Thus, the second matching model may be selected to improve efficiency. In another example, during weekends, seldom people want to access the building. Then, security is more important than efficiency. Thus, the first matching model may be selected to improve security.

The identity determiner 1420 then sends a matched result to the authorization controller. The matched result may include the determined identity and an associated confidence score. In one embodiment, the matched result may include a decision about whether the person should be authorized or not.

Figure 15A:
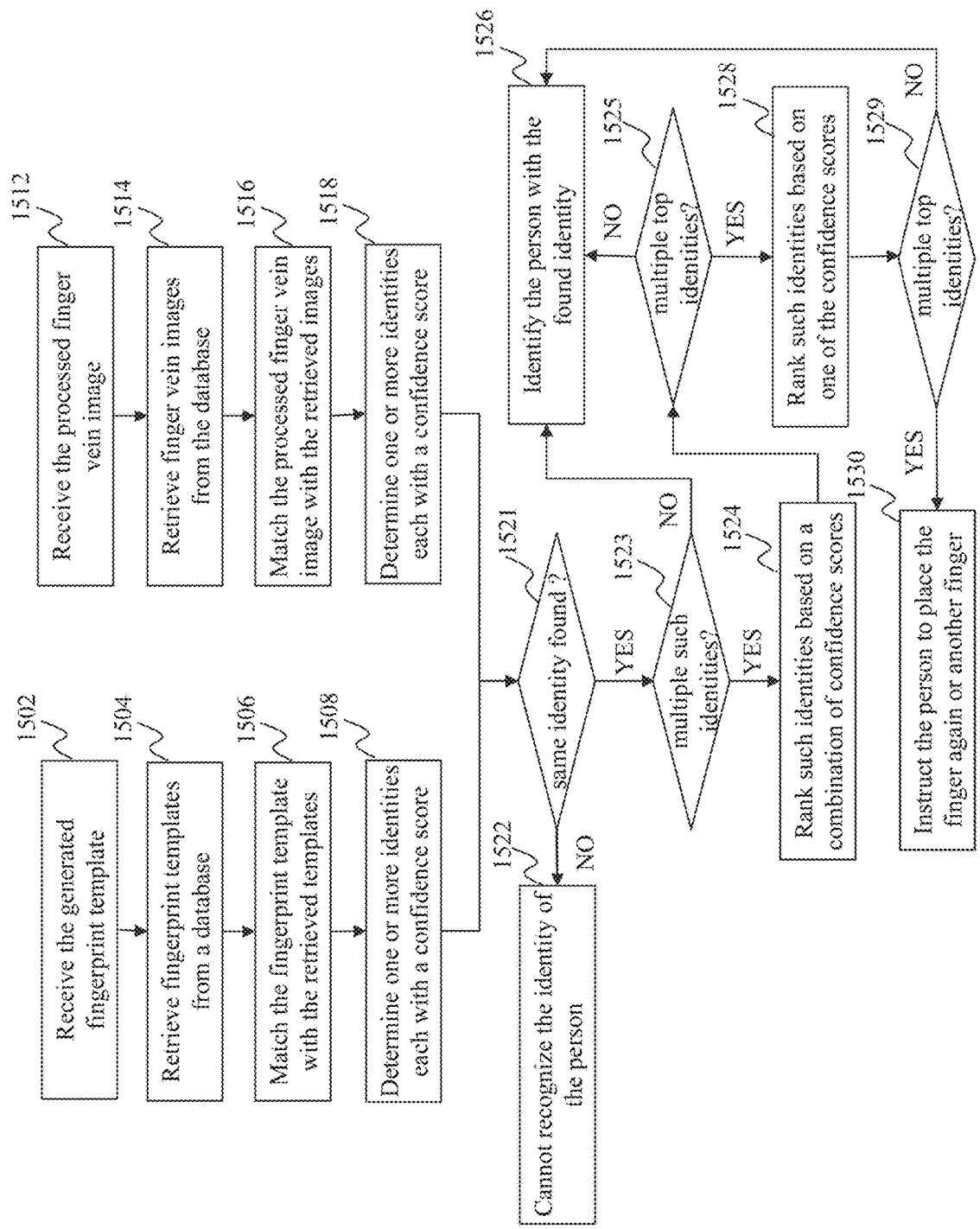
FIG. 15A is a flowchart of an exemplary process performed by an identification/verification unit, according to an embodiment of the present teaching.

FIG. 15A is a flowchart of an exemplary process performed by an identification/verification unit, e.g. the identification/verification unit 520 in the FIG. 14, according to an embodiment of the present teaching. At 1502, the fingerprint template generated by the fingerprint image processing unit 522 is received. At 1504, fingerprint templates are retrieved from a database. At 1506, the fingerprint template is matched with the retrieved fingerprint templates. At 1508, the identification/verification unit 520 determines one or more identities each with a confidence score for fingerprint. The process then goes to 1521.

Another branch of the process includes 1512-1518, in parallel to 1502-1508. At 1512, the characteristic finger vein image is received. At 1514, finger vein images are retrieved from the database. At 1516, the finger vein image is matched with the retrieved finger vein images. At 1518, the identification/verification unit 520 determines one or more identities each with a confidence score for finger vein. The process then goes to 1521.

At 1521, it is checked whether the same identity is found based on matches of the fingerprint and the finger vein. If so, the process goes to 1523. If not, the process goes to 1522, where the identity of the person cannot be recognized from the database. In that case, the person may not be authorized.

At 1523, it is checked whether multiple identities are found at 1521. If not, the process goes to 1526 where the person is identified with the found identity, and the process ends. If multiple identities are found, the process goes to 1524, where such multiple identities are ranked based on a combination of their respective confidence scores. For example, the combination may be a sum of, a weighted average of, a maximum of, or a minimum of the two confidence scores of each such identity. The process then proceeds to 1525.

At 1525, it is checked whether multiple top identities are found based on ranking the combination of their respective confidence scores. If not, the process goes to 1526 where the person is identified with the found identity, i.e. the single top identity, and the process ends. If multiple top identities are found at 1525, the process goes to 1528, where such multiple identities are ranked based on one of their confidence scores. For example, the system may rank such multiple identities based on their respective confidence scores for finger vein, because finger vein is more difficult to forge than fingerprint. The process then proceeds to 1529.

At 1529, it is checked whether multiple top identities are found based on ranking one of their confidence scores. This may happen if multiple identities have the exact same two confidence scores for both fingerprint and finger vein. If so, the process goes to 1530, where the system can instruct the person to place the finger again or place another finger for identification. If not, the process goes to 1526 where the person is identified with the found identity, i.e. the single top identity, and the process ends.

Figure 15B:
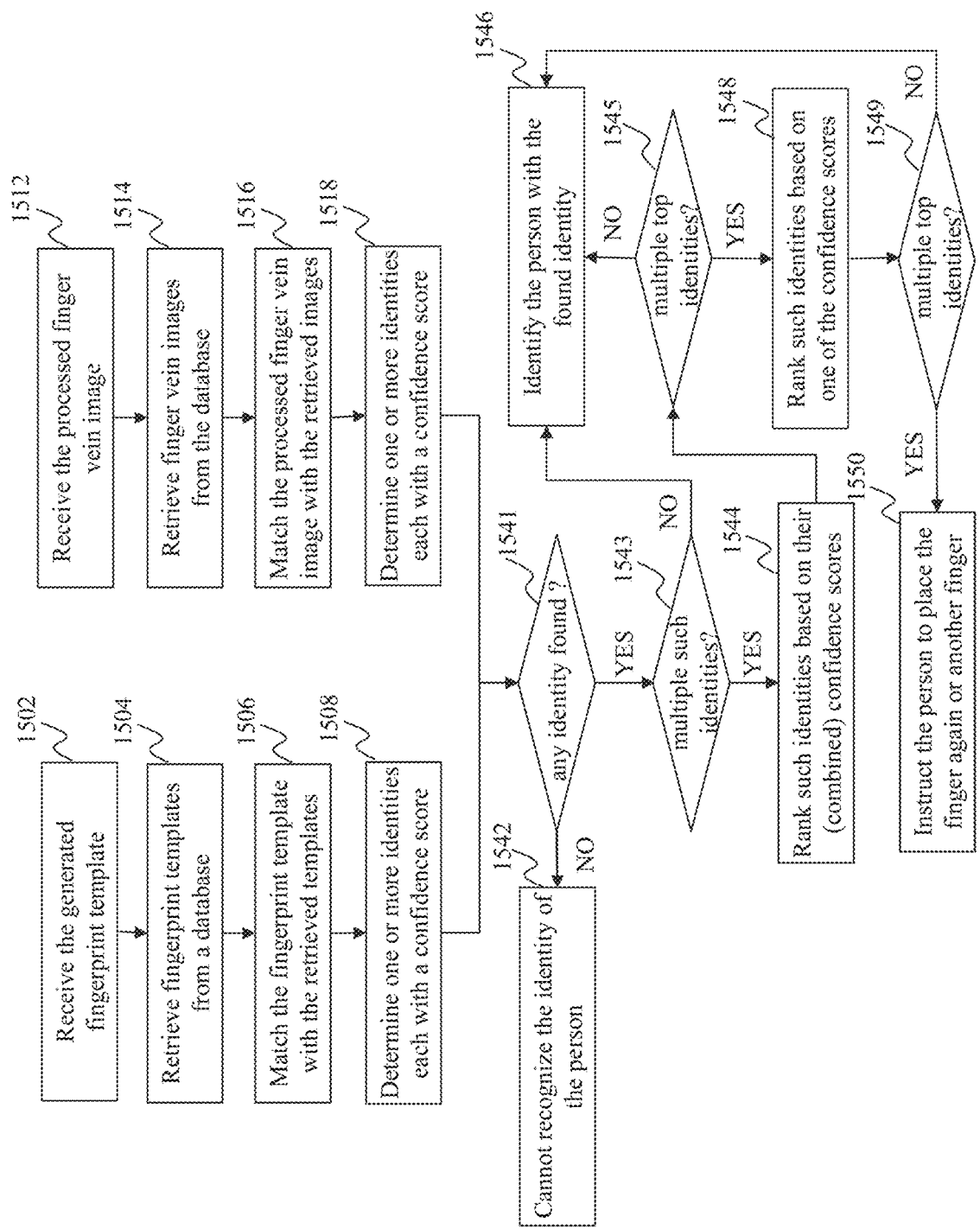
FIG. 15B is a flowchart of another exemplary process performed by an identification/verification unit, according to another embodiment of the present teaching.

FIG. 15B is a flowchart of another exemplary process performed by an identification/verification unit, e.g. the identification/verification unit 520 in the FIG. 14, according to another embodiment of the present teaching. The process of 1502-1508 and the process of 1512-1518 are the same as the corresponding portion in FIG. 15A.

Here in FIG. 15B, after 1508 and 1518, the process goes to 1541, where it is checked whether any identity is found based on matches of the fingerprint and the finger vein. If so, the process goes to 1543. If not, the process goes to 1542, where the identity of the person cannot be recognized from the database. In that case, the person may not be authorized.

At 1543, it is checked whether multiple identities are found at 1541. If not, the process goes to 1546 where the person is identified with the found identity, and the process ends. If multiple identities are found, the process goes to 1544, where such multiple identities are ranked based on their respective confidence scores. If any one of such multiple identities has two confidence scores, the system ranks the identity based on a combination of the two confidence scores. For example, the combination may be a sum of, a weighted average of, a maximum of, or a minimum of the two confidence scores. The process then proceeds to 1545.

At 1545, it is checked whether multiple top identities are found based on the ranking at 1544. If not, the process goes to 1546 where the person is identified with the found identity, i.e. the single top identity, and the process ends. If multiple top identities are found at 1545, the process goes to 1548, where such multiple identities are ranked based on one of their confidence scores. For example, the system may rank such multiple identities based on their respective confidence scores for finger vein, because finger vein is more difficult to forge than fingerprint. The process then proceeds to 1549.

At 1549, it is checked whether multiple top identities are found based on ranking one of their confidence scores. This may happen if multiple identities have the exact same two confidence scores for both fingerprint and finger vein. This may also happen if multiple identities have one single match score that is a same confidence score for fingerprint or finger vein. If so, the process goes to 1550, where the system can instruct the person to place the finger again or place another finger for identification. If not, the process goes to 1546 where the person is identified with the found identity, i.e. the single top identity, and the process ends.

Figure 16:
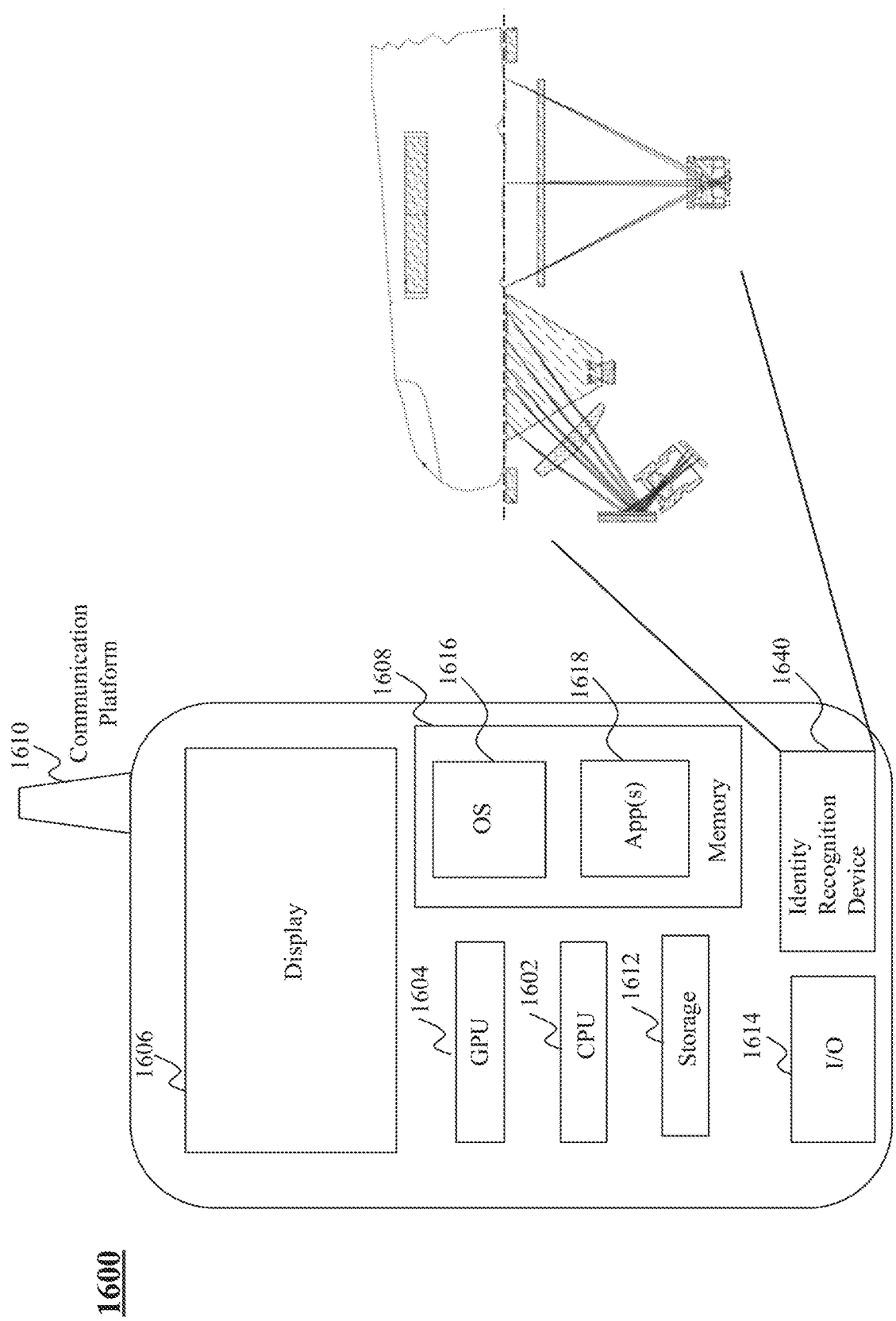
FIG. 16 depicts a general mobile device architecture on which the present teaching can be implemented.

FIG. 16 depicts a general mobile device architecture on which the present teaching can be implemented. In one example, the authorization controller 310-4 controls access to a mobile device 1600, including but is not limited to, a smart phone, a tablet, a music player, a handled gaming console, a GPS receiver. The mobile device 1600 in this example includes one or more central processing units (CPUs) 1602, one or more graphic processing units (GPUs) 1604, a display 1606, a memory 1608, a communication platform 1610, such as a wireless communication module, storage 1612, and one or more input/output (I/O) devices 1614. Any other suitable component, such as but not limited to a system bus or a controller (not shown), may also be included in the mobile device 1600. As shown in FIG. 16, a mobile operating system 1616, e.g., iOS, Android, Windows Phone, etc., and one or more applications 1618 may be loaded into the memory 1608 from the storage 1612 in order to be executed by the CPU 1602. The applications 1618 may include a web browser or any other suitable mobile search apps. Execution of the applications 1618 may cause the mobile device 1400 to perform some processing as described before.

In another example, an identity recognition device 1640 according to various embodiments in the present teaching can be integrated in the mobile device 1600. In this example, a user's identity may be determined or verified by placing a finger on the identity recognition device 1640 on the mobile device 1600. The user identification in this example may be used for a user to obtain access to either the mobile device 1600 or another device, e.g. a car or a controller at a door that can communicate with the mobile device 1600.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 1C:
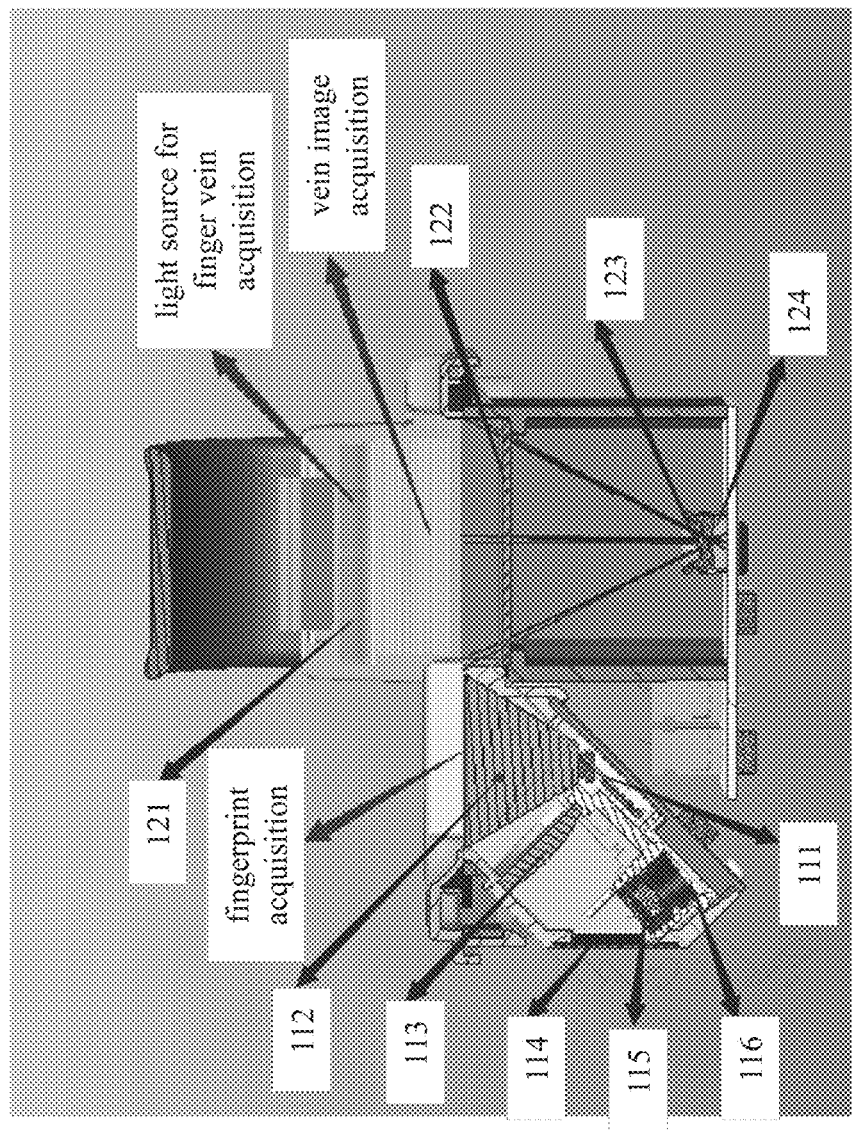
FIG. 1C illustrates a sectional view of a portion of an exemplary product, according to an embodiment of the present teaching.
Figure 17:
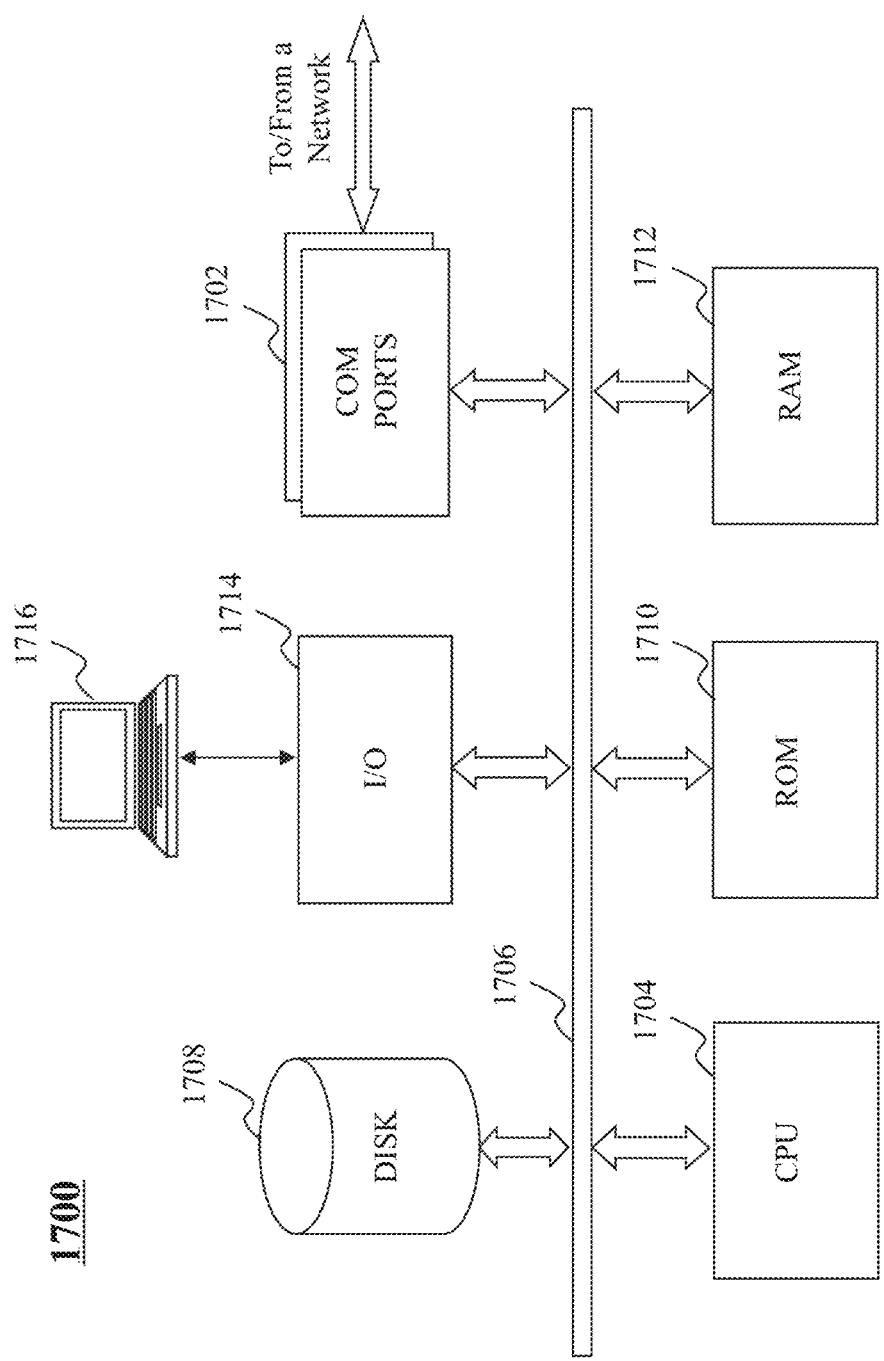
FIG. 17 depicts a general computer architecture on which the present teaching can be implemented.

FIG. 17 depicts a general computer architecture on which the present teaching can be implemented and has a functional block diagram illustration of a computer hardware platform that includes user interface elements. The computer may be a general-purpose computer or a special purpose computer. This computer 1700 can be used to implement any components of the user identification architecture as described herein. Different components of the system, e.g., as depicted in FIGS. 1 and 2, can all be implemented on one or more computers such as computer 1700, via its hardware, software program, firmware, or a combination thereof. Although only one such computer is shown, for convenience, the computer functions relating to user identification may be implemented in a distributed fashion on a number of similar platforms, to distribute the processing load.

The computer 1700, for example, includes COM ports 1702 connected to and from a network connected thereto to facilitate data communications. The computer 1700 also includes a CPU 1704, in the form of one or more processors, for executing program instructions. The exemplary computer platform includes an internal communication bus 1706, program storage and data storage of different forms, e.g., disk 1708, read only memory (ROM) 1710, or random access memory (RAM) 1712, for various data files to be processed and/or communicated by the computer, as well as possibly program instructions to be executed by the CPU 1704. The computer 1700 also includes an I/O component 1714, supporting input/output flows between the computer and other components therein such as user interface elements 1716. The computer 1700 may also receive programming and data via network communications.

Hence, aspects of the method of user identification, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Figure 18:
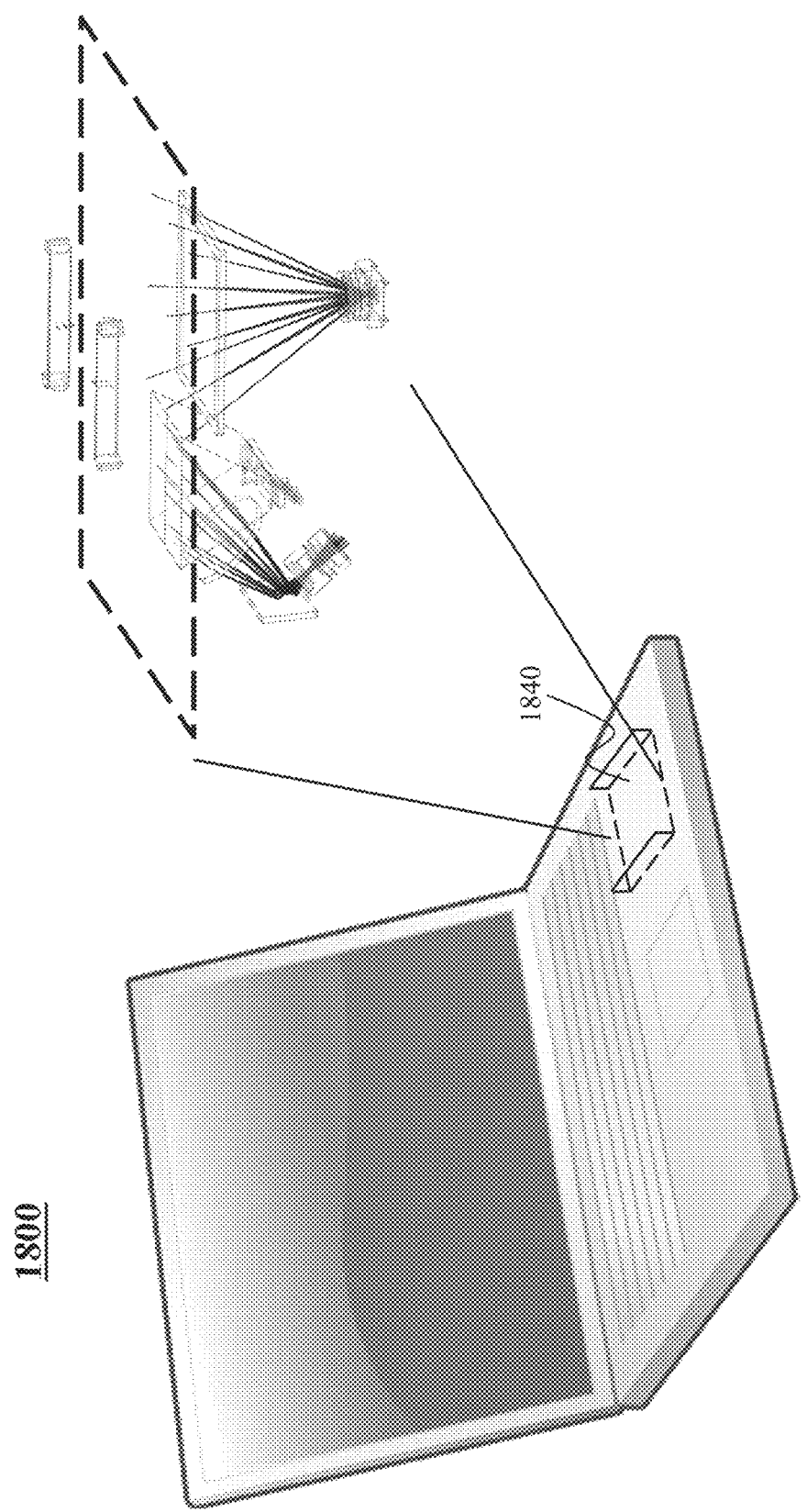
FIG. 18 depicts an exemplary manner in which the present teaching can be implemented on a general computer.

FIG. 18 depicts an exemplary manner in which the present teaching can be implemented on a general computer. In this example, an identity recognition device 1840 according to various embodiments in the present teaching can be integrated in a laptop 1800. In this example, a user's identity may be determined or verified by placing a finger on the identity recognition device 1840 on the laptop 1800. The user identification in this example may be used for a user to obtain access to either the laptop 1800 or another device, e.g. a car or a controller at a door that can communicate with the laptop 1800.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the units of the host and the client nodes as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A system for recognizing a person, comprising:
a housing including a surface for a person to place a finger thereon;
a first light source disposed beneath the surface at one end of the housing, the first light source being configured to emit a first radiation to a first portion of the finger;
a prism disposed between the first light source and the surface, wherein the first radiation is transmitted through the prism and reflected by the finger;
a magnifying lens configured for magnifying the first radiation reflected by the finger;
a mirror configured for reflecting the first radiation magnified by the magnifying lens;
a minifying lens configured for minifying the first radiation reflected by the mirror;
a second light source including a pair of opposing and parallel light plates and disposed above the surface of the housing, wherein the finger is placed between the light plates;
a first sensor configured for acquiring a first image of a fingerprint of the person based on sensing the first radiation minified by the minifying lens and transforming the sensed first radiation into electrical signals to acquire the first image;
a second sensor configured for acquiring a second image of a finger vein of the person based on the second light source; and
an identification/verification module, implemented on at least one processor, configured for recognizing the person based on a first set of candidates identified based on the first image and a second set of candidates identified based on the second image.

2. The system of claim 1, wherein the identification/verification module comprises:
a fingerprint image processing unit, implemented on at least one processor, configured for generating a fingerprint template based on the first image;
a finger vein image processing unit, implemented on at least one processor, configured for generating a characteristic finger vein image based on the second image; and
an identification/verification unit, implemented on at least one processor, configured for recognizing the person based on the fingerprint template and the characteristic finger vein image.

3. The system of claim 2, wherein the identification/verification unit comprises:
a fingerprint based matching unit, implemented on at least one processor, configured for comparing the fingerprint template with a plurality of stored fingerprint templates to identify the first set of candidates; and
a finger vein based matching unit, implemented on at least one processor, configured for comparing the characteristic finger vein image with each of a plurality of stored characteristic finger vein images to identify the second set of candidates.

4. The system of claim 1, wherein:
the first set of candidates includes one or more candidates each of which is associated with a confidence score;
the second set of candidates includes one or more candidates each of which is associated with a confidence score; and
the person is recognized based on the confidence scores.

5. The system of claim 4, wherein:
the person is recognized as a common candidate in the first and second sets of candidates; and
if there are multiple common candidates in the first and second sets of candidates, the person is recognized based on a combination of the confidence scores for each of the common candidates.

6. The system of claim 5, wherein the combination of the confidence scores includes at least one of: a sum of, a weighted average of, a maximum of, and a minimum of the confidence scores.

7. The system of claim 3, wherein the finger vein image processing unit comprises:
a finger vein segmentation unit configured for segmenting a region in the finger vein image where the finger vein is present to generate a segmented image;
a finger vein image normalizer configured for normalizing the segmented image to generate a normalized image;
a finger vein extractor configured for identifying blood vessels based on the normalized image to generate a binary image;
an image enhancement unit configured for enhancing the binary image to generate an enhanced image; and an image compression unit configured for compressing the enhanced image to generate the characteristic finger vein image.

8. The system of claim 7, wherein the finger vein image normalizer is configured for normalizing at least one of shape, size, direction, and gray level of the segmented image.

9. The system of claim 7, wherein the finger vein extractor is configured for determining, for each pixel in the normalized image, whether the pixel represents a portion of a blood vessel based on a predetermined threshold.

10. The system of claim 3, wherein comparing the characteristic finger vein image with each stored characteristic finger vein image comprises:
for each offset value of a plurality of offset values,
aligning the characteristic finger vein image with the candidate characteristic finger vein image based on a next offset value;
computing a matching score associated with the offset value based on a match between the characteristic finger vein image and the candidate characteristic finger vein image aligned using the offset value;
selecting a matching score from a plurality of matching scores corresponding to matches between the characteristic finger vein image and the candidate characteristic finger vein image using the plurality of offset values; and
designating the selected matching score as a confidence score of the candidate characteristic finger vein image.

11. A method, implemented on a machine having at least one processor and storage for recognizing a person, comprising:
illuminating, upon a finger of the person being placed on a surface of a housing, the finger by a first light source disposed beneath the surface at one end of the housing and a second light source disposed above the surface of the housing, wherein the finger is placed between a pair of opposing and parallel light plates included in the second light source, and wherein, the first light source is configured to emit a first radiation to a first portion of the finger;
transmitting, via a prism disposed between the first light source and the surface, the first radiation to the finger;
magnifying the first radiation reflected by the finger;
reflecting the first radiation;
minifying the first radiation;
acquiring, by a first sensor, a first image of a fingerprint of the person based on transforming the minified first radiation into electrical signals to acquire the first image;
acquiring, by a second sensor, a second image of a finger vein of the person based on the second light source, wherein the second sensor is spaced apart from the first sensor;
determining a first set of candidates based on the first image;
determining a second set of candidates based on the second image; and
recognizing the person based on the first and/or second set of candidates.

12. The method of claim 11, wherein determining the first set of candidates comprises:
generating a fingerprint template based on the first image; and
comparing the fingerprint template with a plurality of stored fingerprint templates to determine the first set of candidates.

13. The method of claim 11, wherein determining the second set of candidates comprises:
generating a characteristic finger vein image based on the second image; and
comparing the characteristic finger vein image with each of a plurality of stored characteristic finger vein images to determine the second set of candidates.

14. The method of claim 11, wherein:
the first set of candidates includes one or more candidates each of which is associated with a confidence score;
the second set of candidates includes one or more candidates each of which is associated with a confidence score; and
the person is recognized based on the confidence scores.

15. The method of claim 14, wherein:
the person is recognized as a common candidate in the first and second sets of candidates; and
if there are multiple common candidates in the first and second sets of candidates, the person is recognized based on a combination of the confidence scores for each of the common candidates.

16. The method of claim 15, wherein the combination of the confidence scores includes at least one of: a sum of, a weighted average of, a maximum of, and a minimum of the confidence scores.

17. The method of claim 13, wherein generating a characteristic finger vein image comprises:
segmenting a region in the finger vein image where the finger vein is present to generate a segmented image;
normalizing the segmented image to generate a normalized image;
identifying blood vessels based on the normalized image to generate a binary image;
enhancing the binary image to generate an enhanced image; and
compressing the enhanced image to generate the characteristic finger vein image.

18. The method of claim 17, wherein normalizing the segmented image comprises normalizing at least one of shape, size, direction, and gray level of the segmented image.

19. The method of claim 17, wherein identifying blood vessels comprises determining, for each pixel in the normalized image, whether the pixel represents a portion of a blood vessel based on a predetermined threshold.

20. The method of claim 13, wherein the step of comparing the characteristic finger vein image with each stored characteristic finger vein characteristic image comprises:
for each offset value of a plurality of offset values,
aligning the characteristic finger vein image with the candidate characteristic finger vein image based on the next offset value;
computing a matching score associated with the offset value based on a match between the characteristic finger vein image and the candidate characteristic finger vein image aligned using the offset value;
selecting a matching score from a plurality of matching scores corresponding to matches between the characteristic finger vein image and the candidate characteristic finger vein image using the plurality of offset values; and
designating the selected matching score as a confidence score of the candidate characteristic finger vein image.

21. A method, implemented on a machine having at least one processor and storage for identifying a person, comprising:

illuminating, upon a finger of the person being placed on a surface of a housing, the finger by a first light source disposed beneath the surface at one end of the housing and a second light source disposed above the surface of the housing, wherein the finger is placed between a pair of opposing and parallel light plates included in the second light source, and wherein, the first light source is configured to emit a first radiation to a first portion of the finger;

transmitting, via a prism disposed between the first light source and the surface, the first radiation to the finger;

magnifying the first radiation reflected by the finger;

reflecting the first radiation;

minifying the first radiation;

receiving a fingerprint image acquired from the person via a first sensor based on the first light source, wherein the first sensor transforms the minified first radiation into electrical signals to acquire the fingerprint image;

receiving a finger vein image acquired from the person via a second sensor based on the second light source, wherein the second sensor is spaced apart from the first sensor;

generating a characteristic finger vein image based on the finger vein image;

comparing the characteristic finger vein image with each of a plurality of candidate characteristic finger vein images stored in a database so that each of the candidate characteristic finger vein images is associated with a confidence score;

selecting one or more matching candidates based on the confidence scores associated therewith; and identifying the person based on the confidence score of each of the one or more matching candidates and the fingerprint image.

22. The method of claim 21, wherein the step of generating comprises:

segmenting a region in the finger vein image where the finger vein is present to generate a segmented image;

normalizing the segmented image to generate a normalized image; and identifying blood vessels of the finger vein based on the normalized image to generate a binary image.

23. The method of claim 22, wherein the step of normalizing is directed to at least one of shape, size, direction, and gray level of the segmented image.

24. The method of claim 22, wherein the step of identifying includes determining, for each pixel in the normalized image, whether the pixel represents a portion of a blood vessel based on a predetermined threshold.

25. The method of claim 22, further comprising:

enhancing the binary image to generate an enhanced image; and compressing the enhanced image to generate the characteristic finger vein image.

26. The method of claim 21, wherein the step of comparing the characteristic finger vein image with each candidate characteristic finger vein image comprises:

for each offset value of a plurality of offset values, aligning the characteristic finger vein image with the candidate characteristic finger vein image based on the next offset value;

computing a matching score associated with the offset value based on a match between the characteristic finger vein image and the candidate characteristic finger vein image aligned using the offset value;

selecting a matching score from a plurality of matching scores corresponding to matches between the characteristic finger vein image and the candidate characteristic finger vein image using the plurality of offset values; and designating the selected matching score as a confidence score of the candidate characteristic finger vein image.

27. The method of claim 21, wherein the step of selecting comprises:

retrieving a pre-determined criterion to be used for selecting the one or more matching candidates; and determining the one or more matching candidates based on the confidence scores associated therewith and the pre-determined criterion.

28. The system of claim 1, wherein the first sensor and the second sensor are disposed beneath the surface of a housing of the system.

29. The system of claim 1, further comprising:

a first presence detecting sensor disposed beneath the surface at a first end of the housing, and configured for sensing presence of a first portion of the finger when the person places the finger on the surface; and a second presence detecting sensor disposed beneath the surface at a second end of the housing, and configured for sensing presence of a second portion of the finger, the second end being opposite the first end of the housing.

* * * * *